(12) United States Patent
Hagari

(10) Patent No.: US 10,578,072 B2
(45) Date of Patent: Mar. 3, 2020

(54) CONTROLLER AND CONTROL METHOD FOR INTERNAL COMBUSTION ENGINE

(71) Applicant: Mitsubishi Electric Corporation, Tokyo (JP)

(72) Inventor: Hideki Hagari, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 127 days.

(21) Appl. No.: 15/955,198

(22) Filed: Apr. 17, 2018

(65) Prior Publication Data
US 2018/0372058 A1    Dec. 27, 2018

(30) Foreign Application Priority Data
Jun. 27, 2017    (JP) ................. 2017-124787

(51) Int. Cl.
| F02P 17/12 | (2006.01) |
| F02P 3/04 | (2006.01) |
| F02D 41/00 | (2006.01) |
| F02D 13/02 | (2006.01) |
| F02D 35/02 | (2006.01) |
| F02P 3/05 | (2006.01) |
| F02P 9/00 | (2006.01) |

(Continued)

(52) U.S. Cl.
CPC .......... *F02P 17/12* (2013.01); *F02D 13/0203* (2013.01); *F02D 35/02* (2013.01); *F02D 41/0002* (2013.01); *F02P 3/0442* (2013.01); *F02P 3/05* (2013.01); *F02D 2041/001* (2013.01); *F02D 2041/002* (2013.01); *F02D 2041/0015* (2013.01); *F02D 2041/1433* (2013.01); *F02P 5/1502* (2013.01); *F02P 9/002* (2013.01)

(58) Field of Classification Search
CPC .. F02P 17/12; F02P 3/0442; F02P 3/05; F02P 5/15; F02P 9/002; F02D 35/02; F02D 41/0002; F02D 2041/001; F02D 2041/0015; F02D 2041/002; F02D 2041/1433
USPC .............................................. 123/306
See application file for complete search history.

(56) References Cited

U.S. PATENT DOCUMENTS

| 8,036,808 B2 * | 10/2011 | Mori ................. H01T 13/40 |
| | | 123/169 EA |
| 2011/0168145 A1 | 7/2011 | Mori |
| 2018/0038338 A1* | 2/2018 | Sugiura ............ F02P 15/10 |

(Continued)

FOREIGN PATENT DOCUMENTS

| JP | 2008-088947 A | 4/2008 |
| JP | 4978737 B2 | 7/2012 |
| JP | 2015-200257 A | 11/2015 |

*Primary Examiner* — Mahmoud Gimie
(74) *Attorney, Agent, or Firm* — Sughrue Mion, PLLC; Richard C. Turner

(57) ABSTRACT

To provide a controller and control method for an internal combustion engine capable of estimating a discharge plasma length and the in-cylinder flow speed accurately by easy method. A controller and a control method for an internal combustion engine detects a secondary voltage which is a voltage generated by the secondary coil, calculates a minimum value of secondary voltage during a discharge period, calculates a discharge plasma length based on the secondary voltage and the minimum value of secondary voltage, and calculates an in-cylinder flow speed based on a time change of the discharge plasma length and a Coulomb force.

14 Claims, 14 Drawing Sheets

(51) Int. Cl.
*F02D 41/14* (2006.01)
*F02P 5/15* (2006.01)

(56) References Cited

U.S. PATENT DOCUMENTS

2018/0266381 A1* 9/2018 Kosuge .................. F02P 15/10
2018/0291861 A1* 10/2018 Hagari .................. F02P 5/145

* cited by examiner

A IN CASE OF NO FLOW AND NO EXTENSION OF DISCHARGE PLASMA

B IN CASE WHERE THERE IS A FLOW AND DISCHARGE PLASMA EXTENDS

A IN CASE OF NO FLOW AND NO EXTENSION OF DISCHARGE PLASMA

B  IN CASE WHERE THERE IS A FLOW AND DISCHARGE PLASMA EXTENDS

JUST AFTER
DISCHARGE STARTING

DURING DISCHARGE
PLASMA EXTENSION

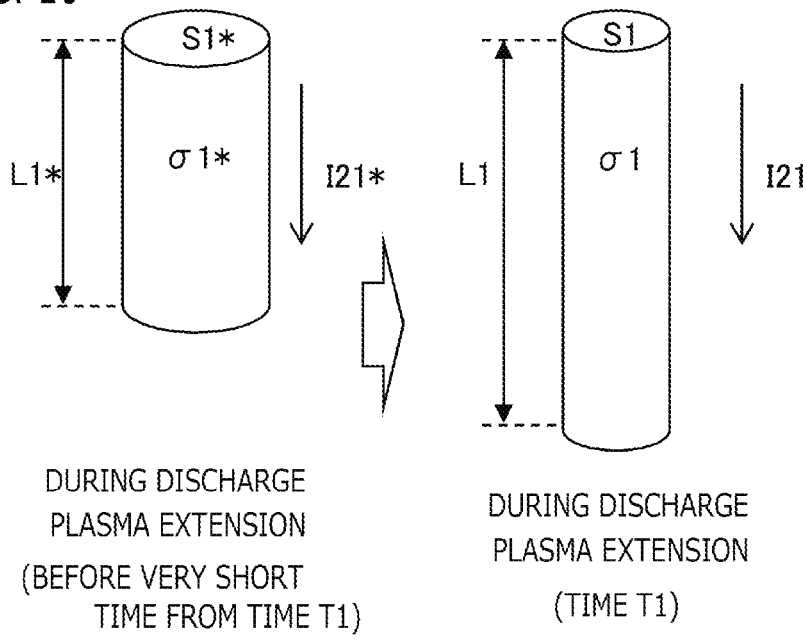
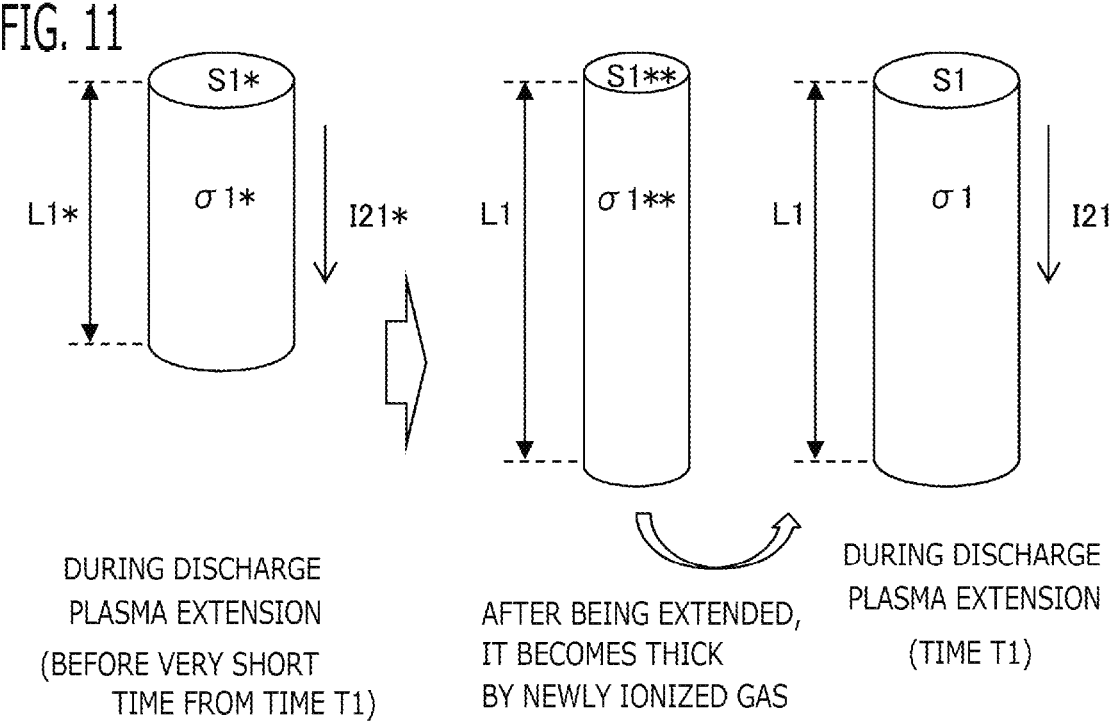

| m | 0 | 1 | 2 | . . . . |
|---|---|---|---|---------|
| V2 | ○○ | ○○ | ○○ | . . . . |
| L | ○○ | ○○ | ○○ | . . . . |
| ΔL | — | ○○ | ○○ | . . . . |
| vp | — | ○○ | ○○ | . . . . |
| pm | ○○ | ○○ | ○○ | . . . . |
| va | — | ○○ | ○○ | . . . . |

CONTROLLER AND CONTROL METHOD FOR INTERNAL COMBUSTION ENGINE

INCORPORATION BY REFERENCE

The disclosure of Japanese Patent Application No. 2017-124787 filed on Jun. 27, 2017 including its specification, claims and drawings, is incorporated herein by reference in its entirety.

BACKGROUND

The present disclosure relates to a controller and a control method for an internal combustion engine that is provided with an ignition coil.

To date, as the ignition device of the internal combustion engine, there has been known an ignition system in which the voltage stepped up by the ignition coil is supplied to the ignition plug, the spark discharge (here, it means a dielectric breakdown and a subsequent formation of discharge plasma) is generated between the gap of the ignition plug disposed in the combustion chamber of the internal combustion engine, and the spark ignition is performed to the fuel-air mixture in the combustion chamber by energy which the spark discharge supplies.

In recent years, the demand to the ignition system becomes highly functional for downsizing by supercharging, high compression ratio, and high dilution combustion which are the trends aiming to improve the fuel efficiency of the internal combustion engine. That is, in the internal combustion engine downsized by supercharging, or the internal combustion engine of high compression ratio, there is the trend that the internal cylinder pressure at the time of spark ignition becomes high significantly, as compared with the conventional internal combustion engine; consequently, because breakdown voltage also becomes high, output energy increase of the ignition coil is required, and high withstand voltage performance of the ignition coil and the ignition plug is also required. High dilution combustion is high EGR combustion and high lean burn combustion. Such fuel-air mixture generally has a narrow stable combustion region. In order to burn this stably, it is known that it is effective to increase the output energy of the ignition coil, to extend the discharge period, to strengthen the in-cylinder flow, and the like.

By the way, when performing spark ignition in the internal combustion engine which can generate a strong in-cylinder flow using the ignition coil which increased output energy as described above, it is known that the phenomena that the discharge plasma which occurs between the gap of the ignition plug is flowed and extends long by the in-cylinder flow will occur. By being flowed and extending of the discharge plasma in this way, rather, the fuel-air mixture around the discharge plasma is activated, and the influence of cooling by the electrode also decreases because the discharge plasma departs from the ignition plug; therefore, it is known that even in high dilution combustion, it is effective in stabilization of combustion. This phenomenon is described in JP 2008-88947 A, JP 4978737 B, and JP 2015-200257 A, for example.

In the technology disclosed in JP 2008-88947 A, by interrupting discharge when the flow of discharge sparks is observed based on the ignition current value, and suppressing the difference between the case where the discharge was flowed and the case where the discharge was not flowed, the output fluctuation between cycles is suppressed. In the technology disclosed in JP 4978737 B, discharge path length is calculated based on discharge voltage, and the length of discharge is controlled by the electromagnet provided in the ignition plug. In the method disclosed in JP 2015-200257 A, an air flow speed in the combustion chamber is estimated, based on a change in slope of the secondary current accompanying a change in the secondary voltage.

SUMMARY

The applicant of the present disclosure performed the visualization experiment of spark ignition uniquely in environment with flow and without flow, and measured the secondary current and the secondary voltage of the ignition coil at this time. As a result, when there is no flow, i.e., discharge is not flowed, it was found out that discharge is performed in the state where the secondary voltage is almost constant, and the secondary current decreases gradually. When there is flow, i.e., discharge is flowed, it was found out that the secondary voltage increases as discharge plasma extends, and decrease of the secondary current also becomes early, as compared with the case where there is no flow.

The applicant of the present disclosure advances study further and studies the relationship among the secondary current, the secondary voltage, the discharge plasma length, the in-cylinder flow, and the combustion stability; and the applicant considered that if the discharge plasma length and the in-cylinder flow speed can be calculated more accurately, the combustion stability can be improved by operating the in-cylinder flow and the ignition energy based on the discharge plasma length and the in-cylinder flow speed. This is because it is considered that since the discharge plasma is blown off when the in-cylinder flow is too strong and the discharge plasma does not extend when the in-cylinder flow is too weak, the in-cylinder flow of a degree that the discharge plasma is not blown off is the optimal; and the discharge plasma becomes difficult to be blown off by increasing the ignition energy.

However, the methods disclosed in JP 2008-88947 A, JP 4978737 B, and JP 2015-200257 A only mention that there is some correlation among the secondary current, the secondary voltage, the discharge plasma length, and the in-cylinder flow speed; and even if the relationship between the secondary voltage and the discharge plasma length is memorized as a control map, it is unknown how detailed map is required; also, since content such as an approximate expression is not shown, it is unknown how discharge plasma length is calculated concretely. The same applies to the relationship among the secondary current, the secondary voltage, and the in-cylinder flow speed. Although it is considered to use the secondary voltage directly instead of the discharge plasma length and the in-cylinder flow speed, since the secondary voltage changes largely according to the environment in the cylinder (pressure, temperature, air-fuel ratio, and the like), it is considered that parameter setting and matching become complicated for controlling by the secondary voltage.

Thus, it is desirable to provide a controller and control method for an internal combustion engine capable of estimating a discharge plasma length and the in-cylinder flow speed accurately by easy method.

A controller for an internal combustion engine according to the present disclosure is a controller for an internal combustion engine that is provided with an ignition plug which has a plug gap disposed in a combustion chamber, and an ignition coil which has a primary coil in which power is supplied from a direct current power source and a secondary coil which has more winding number than the primary coil and generates high voltage supplied to the ignition plug, the controller for the internal combustion engine includes:

an ignition coil control unit that shuts down after connecting electrically the primary coil and the direct current power source for generating high voltage in the secondary coil and generating spark discharge in the plug gap;

a secondary voltage detection unit that detects a secondary voltage which is a voltage generated by the secondary coil;

a secondary voltage minimum value calculation unit that calculates a minimum value of the secondary voltage during a discharge period based on the detected secondary voltage;

a discharge plasma length calculation unit that calculates a length of the discharge plasma based on the secondary voltage and the minimum value of the secondary voltage; and an in-cylinder flow calculation unit that calculates an in-cylinder flow speed which is a flow speed of gas in the combustion chamber, based on a time change of the length of the discharge plasma and a Coulomb force applied to charged particles of the discharge plasma.

A control method for an internal combustion engine according to the present disclosure is a control method for an internal combustion engine that is provided with an ignition plug which has a plug gap disposed in a combustion chamber, and an ignition coil which has a primary coil in which power is supplied from a direct current power source and a secondary coil which has more winding number than the primary coil and generates high voltage supplied to the ignition plug, the control method for the internal combustion engine includes:

an ignition coil control step that shuts down after connecting electrically the primary coil and the direct current power source for generating high voltage in the secondary coil and generating spark discharge in the plug gap;

a secondary voltage detection step that detects a secondary voltage which is a voltage generated by the secondary coil; a secondary voltage minimum value calculation step that calculates a minimum value of the secondary voltage during a discharge period based on the detected secondary voltage;

a discharge plasma length calculation step that calculates a length of discharge plasma based on the secondary voltage and the minimum value of the secondary voltage; and an in-cylinder flow calculation step that calculates an in-cylinder flow speed which is a flow speed of gas in the combustion chamber, based on a time change of the length of the discharge plasma and a Coulomb force applied to charged particles of the discharge plasma.

According to the controller and the control method for the internal combustion engine concerning the present disclosure, by calculating the minimum value of the secondary voltage during the discharge period, the secondary voltage just after discharge starting which is varied every ignition can be detected. Then, based on the minimum value of the secondary voltage during the discharge period in addition to the secondary voltage, the length of discharge plasma can be estimated accurately by easy method. Due to Coulomb force applied to charged particles of the discharge plasma, the discharge plasma shows a different behavior from the surrounding in-cylinder flow, and it does not become "the change speed of discharge plasma length=In-cylinder flow speed" simply. Since the in-cylinder flow speed is calculated based on Coulomb force in addition to the time change of the discharge plasma length, the in-cylinder flow speed can be estimated with good accuracy by easy method using the discharge plasma length.

BRIEF DESCRIPTION OF THE DRAWINGS

FIG. 10 is an image figure of discharge plasma extension in the concept (B) according to Embodiment 1 of the present disclosure;

FIG. 11 is an image figure of discharge plasma extension in the concept (C) according to Embodiment 1 of the present disclosure;

DETAILED DESCRIPTION OF THE EMBODIMENTS

Embodiment 1

Figure 1:
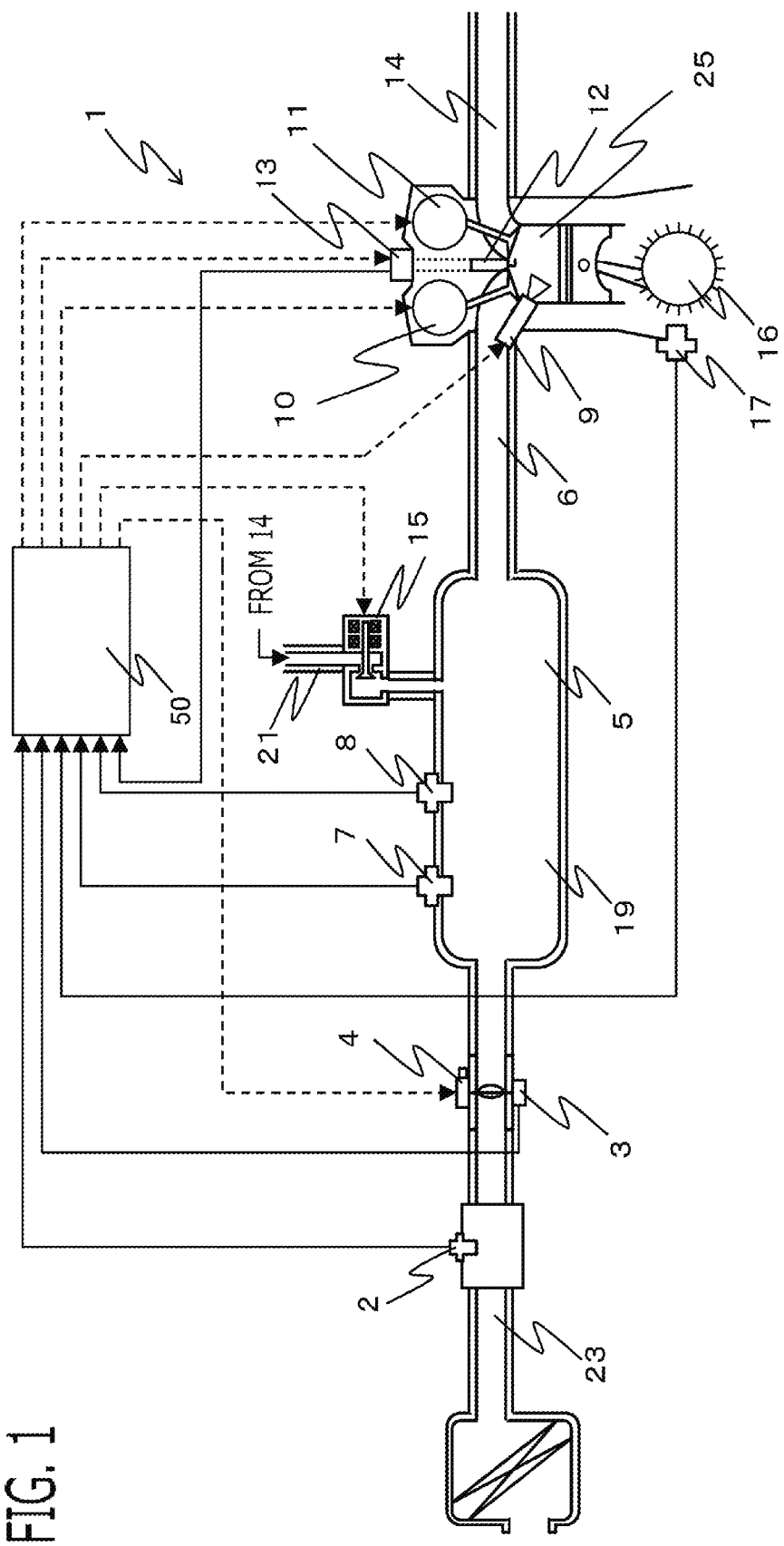
FIG. 1 is a schematic configuration diagram of an internal combustion engine and a controller according to Embodiment 1 of the present disclosure.
Figure 2:
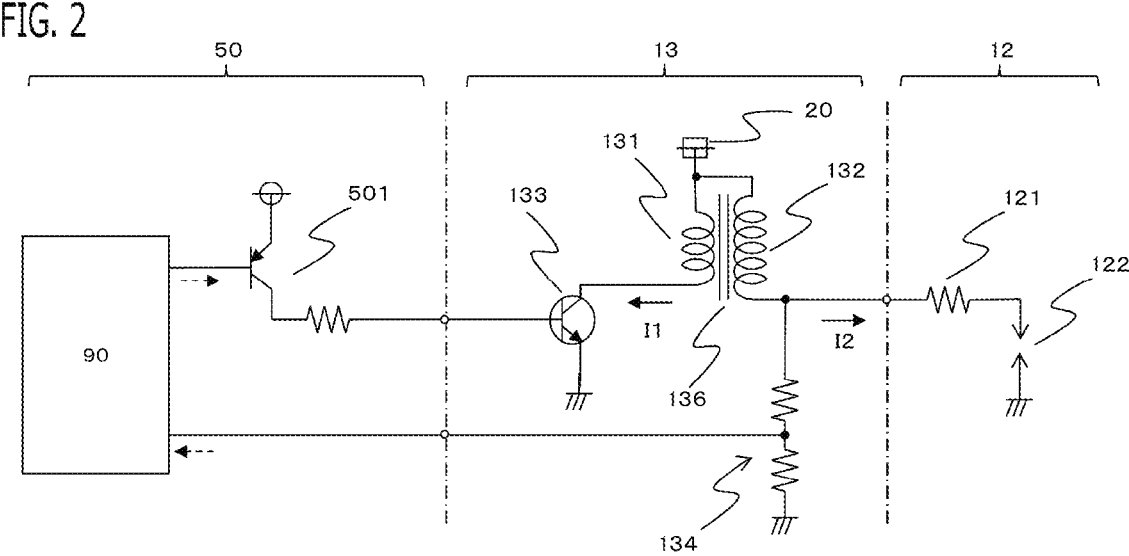
FIG. 2 is a schematic circuit diagram of ignition coil and spark plug according to Embodiment 1 of the present disclosure.
Figure 3:
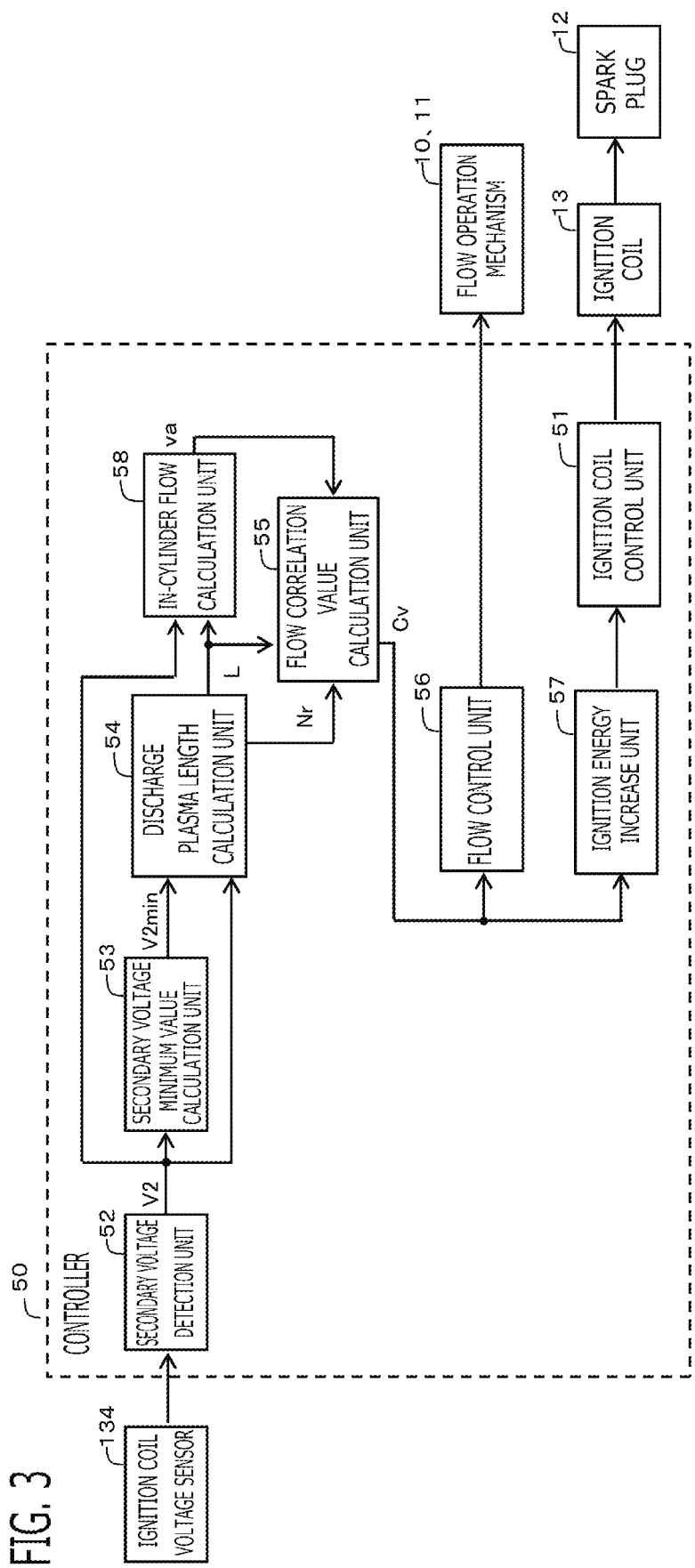
FIG. 3 is a block diagram of a controller according to Embodiment 1 of the present disclosure.

A controller 50 for an internal combustion engine 1 (hereinafter, referred to simply as the controller 50) according to Embodiment 1 will be explained with reference to the drawings. FIG. 1 is a schematic configuration diagram of the internal combustion engine 1 and the controller 50 according to Embodiment 1; FIG. 2 is a schematic circuit configuration diagram of an ignition plug 12, an ignition coil 13, and the controller 50; FIG. 3 is a block diagram of the controller 50. The internal combustion engine 1 and the controller 50 are mounted in a vehicle; the internal combustion engine 1 functions as a driving-force source for the vehicle (wheels).

1. The Configuration of the Internal Combustion Engine 1

The configuration of the internal combustion engine 1 will be explained. The internal combustion engine 1 has a combustion chamber 25 in which a fuel-air mixture is combusted. The combustion chamber 25 is configured by a cylinder and a piston. Hereinafter, "in the combustion chamber" is also referred to "in the cylinder". The internal combustion engine 1 is provided with an intake path 23 for supplying air to the combustion chamber 25 and an exhaust path 14 for discharging exhaust gas from the combustion chamber 25.

An air flow sensor 2 which outputs the electric signal according to a flow rate of the intake air taken into the intake path 23 from atmospheric air is provided in the upstream side part of the intake path 23. An electronic control type throttle valve 4 which opens and closes the intake path 23 is provided in the part of the intake path 23 at the downstream side of the air flow sensor 2. A throttle position sensor 3 which outputs an electric signal according to the opening degree of the throttle valve 4 is provided in the throttle valve 4. The part of the intake path 23 at the downstream side of the throttle valve 4 is an intake manifold 19. The upstream side part of the intake manifold 19 is a surge tank 5 for suppressing an intake air ripple, and the downstream side part of the intake manifold 19 is an intake port 6.

The internal combustion engine 1 is provided with an EGR passage 21 which recirculates the exhaust gas from the exhaust path 14 to the intake manifold 19, and an electronic control type EGR valve 15 which opens and closes the EGR passage 21. In the intake manifold 19, there are provided a manifold pressure sensor 7 which outputs an electric signal according to a manifold pressure Pb, which is the pressure of gas in the intake manifold 12, and a manifold temperature sensor 8 which outputs an electric signal according to a manifold temperature, which is the temperature of gas in the intake manifold 19.

The injector 9 which injects fuel into the combustion chamber 25 is provided in the combustion chamber 25. The injector 9 may be provided in the intake port 6 so as to inject fuel into the intake port 6.

On the top of the combustion chamber 25, there is provided an ignition plug 12 for igniting a fuel-air mixture. An ignition coil 13 for supplying ignition energy to the ignition plug 12 is provided. On the top of the combustion chamber 25, there are provided an intake valve 10 for adjusting the amount of intake air to be taken from the intake path 23 into the combustion chamber 25 and an exhaust valve 11 for adjusting the amount of exhaust gas to be exhausted from the combustion chamber 25 to the exhaust path 14. The intake valve 10 is provided with an intake variable valve timing mechanism which makes the opening and closing timing thereof variable. The exhaust valve 11 is provided with an exhaust variable valve timing mechanism which makes the opening/closing timing thereof variable. Each of the intake and exhaust variable valve timing mechanisms 10, 11 has an electric actuator which changes a phase angle of the opening and closing timing of the valve. On the crankshaft of the internal combustion engine 1, there is provided a rotary plate 16 which has a plurality of teeth, and there is provided a crank angle sensor 17 which outputs an electric signal according to the rotation of the rotary plate 16.

<Spark Plug 12 and Ignition Coil 13>

FIG. 2 shows a circuit configuration diagram of the spark plug 12 and the ignition coil 13. The spark plug 12 is provided with a plug gap 122 which is disposed in the combustion chamber 25 and generates the discharge plasma. The ignition plug 12 is provided with a resistance 121 which is connected in series with the plug gap 122 and suppresses a radio noise.

The ignition coil 13 is provided with a primary coil 131 in which power is supplied from a direct current power source 20, and a secondary coil 132 which has more winding number than the primary coil 131 and generates the high voltage supplied to the ignition plug 12. The primary coil 131 and the secondary coil 132 are wound around the common iron core (core) 136. The primary coil 131, the secondary coil 132, and the core 136 constitute a step-up transformer. The ignition coil 13 is provided with a switching device as the igniter 133 which turns on or turns off the electrical connection from the direct current power source 20 to the primary coil 131. The ignition coil 13 is provided with an ignition coil voltage sensor 134 which outputs an electric signal according to a secondary voltage V2 which is a voltage generated by the secondary coil 132. The ignition coil voltage sensor 134 is a voltage dividing circuit which divides the secondary voltage V2 by two resistances connected in series, and is connected in parallel with the ignition plug 12. The divided voltage of the connection point of two resistances is inputted to the controller 50.

In the present embodiment, one end of the primary coil 131 is connected to the positive electrode of the direct current power source 20, and the other end of the primary coil 131 is connected to the ground (the negative electrode of the direct current power source 20) via the igniter 133. By controlling on/off the igniter 133 by the controller 50, the electrical connection from the direct current power source 20 to the primary coil 131 is turned on or turned off. One end of the secondary coil 132 is connected to the positive electrode of the direct current power source 20, and the other end of the secondary coil 132 is connected to the ground via the ignition plug 12. The other end of the secondary coil 132 is connected to the ground via the ignition coil voltage sensor 134 which is the voltage dividing circuit. The controller 50 is provided with a switching device as an igniter driving circuit 501 which turns on or turns off the igniter 133. The igniter driving circuit 501 is operated by a command signal from the computing processing unit 90.

2. The Configuration of the Controller 50

Next, the controller 50 will be explained. The controller 50 is the one whose control subject is the internal combustion engine 1. As shown in FIG. 3, the controller 50 is provided with control units such as an ignition coil control unit 51, a secondary voltage detection unit 52, a secondary voltage minimum value calculation unit 53, a discharge plasma length calculation unit 54, a flow correlation value calculation unit 55, a flow control unit 56, an ignition energy increase unit 57, and an in-cylinder flow calculation unit 58.

Figure 4:
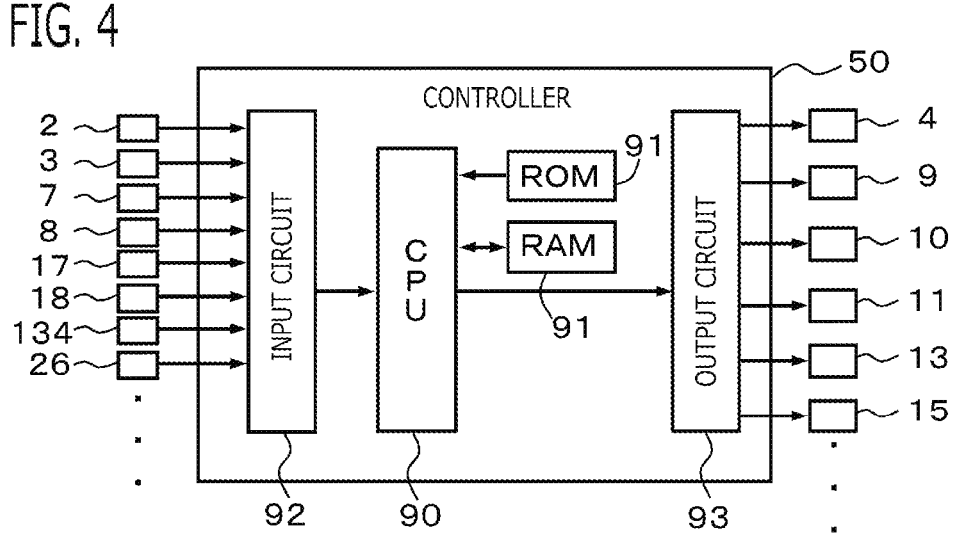
FIG. 4 is a hardware configuration diagram of a controller according to Embodiment 1 of the present disclosure.

The respective control units 51 through 58 and the like of the controller 50 are realized by processing circuits included in the controller 50. Specifically, as shown in FIG. 4, the controller 50 includes, as processing circuits, a computing processing unit (computer) 90 such as a CPU (Central Processing Unit), storage apparatuses 91 that exchange data with the computing processing unit 90, an input circuit 92 which inputs external signals to the computing processing unit 90, an output circuit 93 which outputs signals from the computing processing unit 90 to the outside, and the like.

As the calculation processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the calculation processor 90, a plurality of the same type ones or the different type ones may be provided, and each processing may be shared and executed. As the storage apparatuses 91, there are provided a RAM (Random Access Memory) which can read data and write data from the calculation processor 90, a ROM (Read Only Memory) which can read data from the calculation processor 90, and the like. The input circuit 92 is connected with various kinds of sensors and switches and is provided with an A/D converter and the like for inputting output signals from the sensors and the switches to the calculation processor 90. The output circuit 93 is connected with electric loads and is provided with a driving circuit and the like for outputting a control signal from the computing processing unit 90.

In addition, the computing processing unit 90 runs software items (programs) stored in the storage apparatus 91 such as a ROM and collaborates with other hardware devices in the controller 50, such as the storage apparatus 91, the input circuit 92, and the output circuit 93, so that the respective functions of the control units 51 through 58 included in the controller 50 are realized. Setting data items such as map data and determination value to be utilized in the control units 51 through 58 are stored, as part of software items (programs), in the storage apparatus 91 such as a ROM.

In the present embodiment, the input circuit 92 is connected with the air flow sensor 2, the throttle position sensor 3, the manifold pressure sensor 7, the manifold temperature sensor 8, the crank angle sensor 17, the atmospheric pressure sensor 18, the ignition coil voltage sensor 134, an accelerator position sensor 26, and the like. The output circuit 93 is connected with the throttle valve 4, the injector 9, the intake variable valve timing mechanism 10, the exhaust variable valve timing mechanism 11, the ignition coil 13, the EGR valve 15, and the like. The controller 50 is connected with various kinds of unillustrated sensors, switches, actuators, and the like.

The controller 50 detects various kinds of driving conditions of the internal combustion engine 1 and the vehicle based on the output signals of various kinds of sensors and the like. For example, the controller 50 detects a rotational speed of the internal combustion engine and a crank angle based on the output signal of the crank angle sensor 17 and the like. The controller 50 calculates an intake air amount of the internal combustion engine, a charging efficiency, an EGR rate, and the like, based on the output signals of the air flow sensor 2, the manifold pressure sensor 7, and the like.

As basic control, the controller 50 calculates a fuel injection amount, an ignition timing, and the like, based on the detected driving conditions, and performs driving control of the injector 9, the ignition coil 13, and the like. The controller 50 calculates an output torque of the internal combustion engine 1 demanded by the driver, based on the output signal of the accelerator position sensor 26 and the like; calculates a target charging efficiency, a target EGR rate, and the like for realizing the demanded output torque; and controls the opening degree of the throttle valve 4, the opening degree of the EGR valve 15, and the phase angles of the intake and exhaust variable valve timing mechanisms 10, 11 so as to achieve the target charging efficiency, the target EGR rate, and the like.

2-1. Ignition Coil Control Unit 51

The ignition coil control unit 51 implements an ignition coil control processing (an ignition coil control step) that shuts down after connecting electrically the primary coil 131 and the direct current power source 20 for generating high voltage in the secondary coil 132 and generating spark discharge in the plug gap 122. The ignition coil control unit 51 calculates an energizing time and an ignition timing (an ignition crank angle) to the primary coil 131. The ignition coil control unit 51 calculates a point of time earlier than the ignition timing by the energizing time, as an energization start timing. Then, the ignition coil control unit 51 turns on the igniter 133 via the igniter driving circuit 501 at the energization start timing, and energizes the primary coil 131. The ignition coil control unit 51 turns off the igniter 133 via the igniter driving circuit 501 at the ignition timing, and shuts down the energization of the primary coil 131.

The ignition coil control unit 51 may calculate the energizing time corresponding to the present driving condition, such as the rotational speed and the charging efficiency, by referring to an energizing time map in which the relationship between the driving condition, such as the rotational speed and the charging efficiency, and the energizing time is preliminarily set. Alternatively, the ignition coil control unit 51 may calculate an ignition energy corresponding to the present driving condition, such as the rotational speed and the charging efficiency, by referring to an ignition energy map in which the relationship between the driving condition, such as the rotational speed and the charging efficiency, and the ignition energy is preliminarily set; and calculate the energizing time by using a relational equation between the energizing time and the ignition energy.

The ignition coil control unit 51 may calculate the ignition timing corresponding to the present driving condition, such as the rotational speed and the charging efficiency, by referring to an ignition timing map in which the relationship between the driving condition, such as the rotational speed and the charging efficiency, and the ignition timing is preliminarily set. Alternatively, the ignition coil control unit 51 may calculate the ignition timing by the feedback control which changes the ignition timing so that the combustion gravity center position calculated based on the cylinder internal pressure, which was detected by a pressure sensor or was estimated using crank angle detection information, approaches a target crank angle.

<Behavior at the Time of Ignition>

The behavior at the time of ignition will be explained. The primary current I1 which flows into the primary coil 131 increases gradually after start of energization to the primary coil 131. A magnetic energy corresponding to a magnitude of the primary current I1 is stored in the core 136. Then, when the energization to the primary coil 131 is shut down, the primary current I1 becomes zero, and by the magnetic energy stored in the core 136, the voltage of the secondary coil 132 rises and the voltage between the plug gap 122 rises. When the voltage between the plug gaps 122 exceeds a breakdown voltage between the plug gaps 122, a spark discharge occurs between the plug gaps 122. Here, the spark discharge means whole discharge phenomenon by dielectric breakdown, and glow discharge or arc discharge which occurs between the plug gaps 122 after dielectric breakdown. Plasma which occurs as a discharge path of glow discharge or arc discharge is called discharge plasma. The plug gap 122 is conducted via the discharge plasma occurred by the spark discharge, secondary current I2 flows from the secondary coil 132, and the fuel-air mixture in the combustion chamber 25 is ignited by energy released at the plug gap 122.

2-2. Calculation Principle of Discharge Plasma Length L

<Behavior of in-Cylinder Flow and Discharge Plasma>

Figure 5:
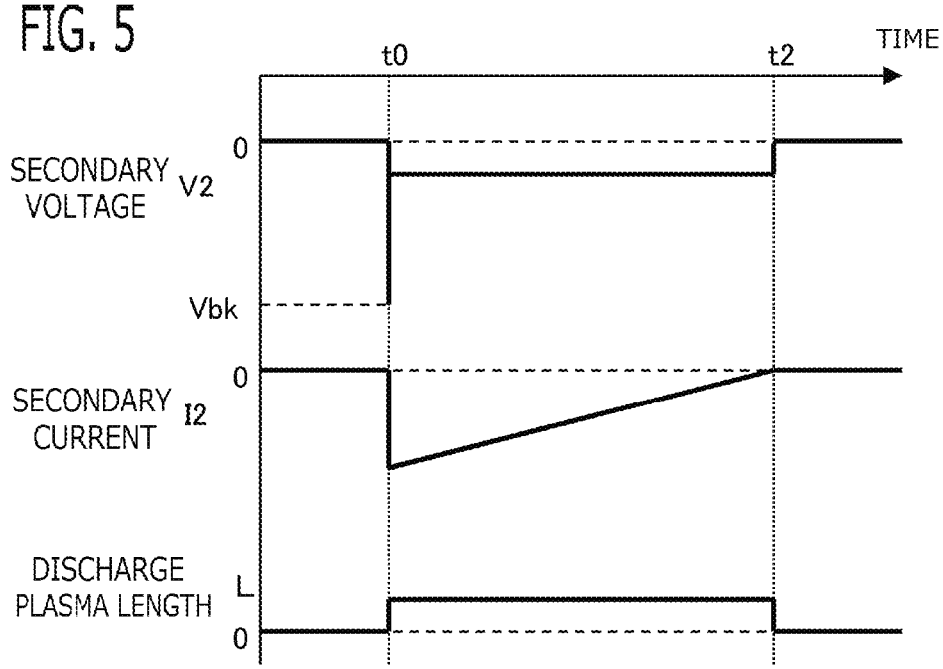
FIG. 5 is a timing chart showing the behavior of the secondary coil side in the case where there is no extension of discharge plasma according to Embodiment 1 of the present disclosure.
Figure 6:
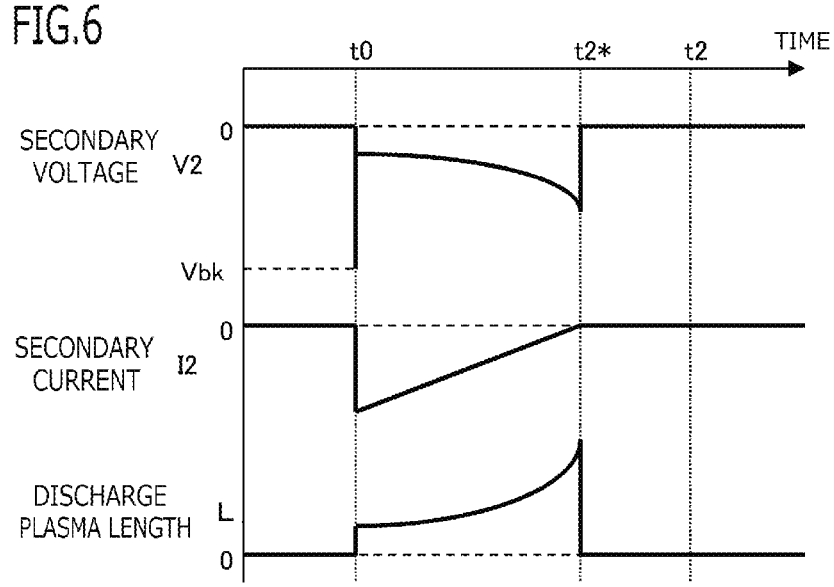
FIG. 6 is a timing chart showing the behavior of the secondary coil side in the case where there is extension of discharge plasma according to Embodiment 1 of the present disclosure.
Figure 7:
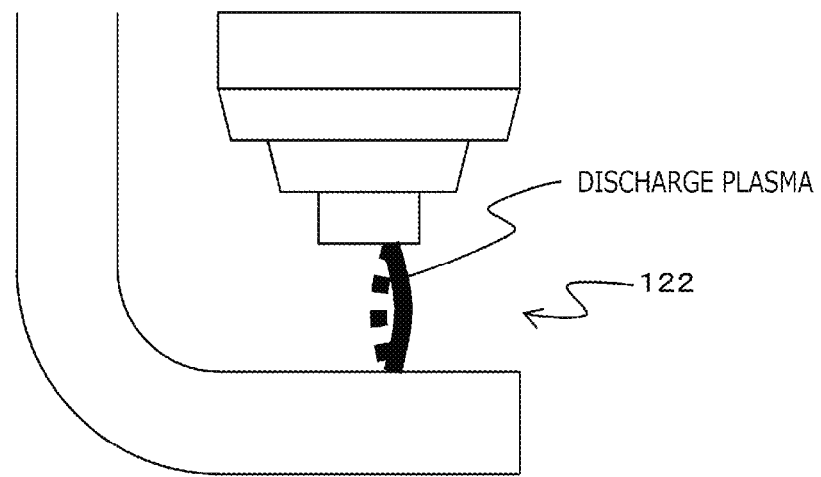
FIG. 7 is an image figure showing discharge plasma in the case where there is no extension of discharge plasma according to Embodiment 1 of the present disclosure.
Figure 8:
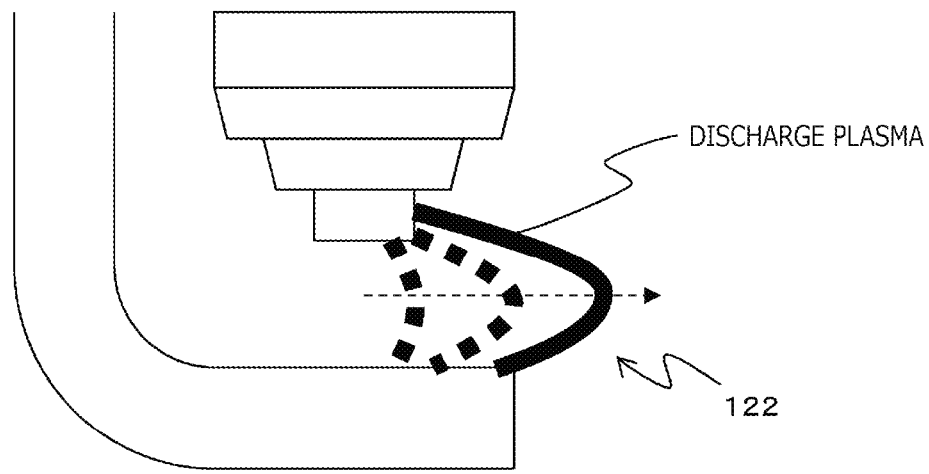
FIG. 8 is an image figure showing discharge plasma in the case where there is extension of discharge plasma according to Embodiment 1 of the present disclosure.

The behavior of the secondary coil 132 side which operates in this way, and the behavior of the discharge plasma which occurs at the plug gap 122 will be explained with reference to FIG. 5 through FIG. 8. FIG. 5 and FIG. 6 are timing charts showing the behavior of the secondary coil 132 side, and FIG. 7 and FIG. 8 are image figures showing the discharge plasma which occurs at the plug gap 122. In each figure, the secondary voltage V2 and the secondary current I2 generate in the negative side; but the direction where absolute value becomes large is explained as increase or rise, and the direction where absolute value becomes small is explained as decrease or fall.

FIG. 5 shows the behavior of the secondary coil 132 side in the case where there is no in-cylinder flow and no extension of discharge plasma; as shown in FIG. 7, the discharge plasma only wavers slightly while occurring at the plug gap 122, and the basic length of discharge plasma is almost the same as the distance between the plug gaps 122. The energization to the primary coil 131 is shut down at the time t0 of FIG. 5. By energization shutdown, the secondary voltage V2 raised to the breakdown voltage Vbk, and the dielectric breakdown occurs. The secondary voltage V2 drops after the dielectric breakdown, and becomes an almost constant discharge maintaining voltage after the time t0. The secondary current I2 increases stepwise from 0 after the dielectric breakdown at the time t0, then decreases by almost constant slope, and becomes zero at the time t2. This is because the magnetic energy stored in the core 136 falls gradually by release of the secondary current I2, thereby the secondary current I2 also falls gradually.

Next, FIG. 6 shows the behavior of the secondary coil 132 side in the case where there is in-cylinder flow and extension of discharge plasma; as shown in FIG. 8, the discharge plasma extends gradually by the in-cylinder flow after occurring at the plug gap 122. At the time t0 of FIG. 6, the energization to the primary coil 131 is shut down; by this energization shutdown, the secondary voltage V2 raised to the breakdown voltage Vbk, and the dielectric breakdown occurs. The secondary voltage V2 once falls to a voltage of the same degree as the case of no flow after the dielectric breakdown, and then increases in accordance with the extension of discharge plasma. The secondary current I2 decreases earlier than the case of no flow, and becomes 0 at the time t2* earlier than the time t2 in the case of no flow. This is because by the rise of the secondary voltage V2, the release amount per unit time of the magnetic energy stored in the core 136 increases, and decrease of the magnetic energy becomes early. Since the release rate [J/s] of energy is power consumption W=V2×I2, even when the secondary current I2 is the same, when the secondary voltage V2 is large, release of the magnetic energy becomes fast.

<Calculation Principle of Discharge Plasma Length>

Based on the discharge phenomenon which occurs at the plug gap 122 and the operation of the ignition coil 13 explained above, concept of calculation method of the discharge plasma length will be explained. When a resistance between the plug gaps 122 (referred to as a gap resistance) during discharge is set to Rg, the relationship of the next equation is established among the secondary voltage V2, the secondary current I2, and the gap resistance Rg.

$$V2 = I2 \cdot Rg \tag{1}$$

When a length of the discharge plasma (referred to as a discharge plasma length) along a flow of discharge current is set to L, a cross-section area of the discharge plasma cut by a plane which is perpendicular to the flow of discharge current is set to S, and the discharge plasma is supposed to be a conductor of an electric conductivity σ, the gap resistance Rg can be expressed by the next equation.

$$Rg = \frac{L}{\sigma \cdot S} \tag{2}$$

When the equation (2) is substituted in the equation (1) and modified, the relationship of the next equation is obtained.

$$V2 = I2 \cdot \frac{L}{\sigma \cdot S} = \frac{I2}{\sigma \cdot S} \cdot L \tag{3}$$

<In the Case of No Flow>

The case of no flow (no extension of the discharge plasma) will be considered. As explained using FIG. 5 and FIG. 7, in the state of no flow, the discharge plasma length L is almost constant, and in this case, the secondary voltage V2 also becomes almost constant. Therefore, from the equation (3), the relationship of the next equation is established.

$$\frac{I2}{\sigma \cdot S} = Const. \Rightarrow \therefore I2 \propto \sigma \cdot S \tag{4}$$

Here, "Const." denotes that it is a constant value. "σ·S" is a conductance per unit length of the discharge plasma, i.e., a flow easiness of current per unit length, the equation (4) shows that if the secondary current I2 becomes small, current becomes difficult to flow. Its reciprocal 1/(σ·S) means a resistance per unit length.

Meanwhile, plasma is in the state where molecules constituting gas are ionized and positive ions and electrons are moving separately; since this ionized gas contains charged particles, it shows conductivity. The rate of ionization of gas is called ionization degree η, and since it is considered that conductivity changes according to the ionization degree η, it is considered that the ionization degree η and the electric conductivity σ are correlated. Since it is considered that the ionization degree η and luminescence intensity of plasma are correlated, it is considered that the luminosity of discharge and the electric conductivity σ are also correlated. When the discharge plasma in the case of no flow (no extension of discharge) was observed, it was found out that the discharge plasma which was bright and thick just after discharge starting becomes dark and thin gradually as the secondary current I2 decreases, and it disappears at the time of discharge end. As a result of this, as described above, when the secondary current I2 becomes small, it is assumed to be observed that σ·S which is a product of the electric conductivity σ and the cross-section area S also becomes small.

<In the Case where there is Flow (Concept (A))>

Figure 9:
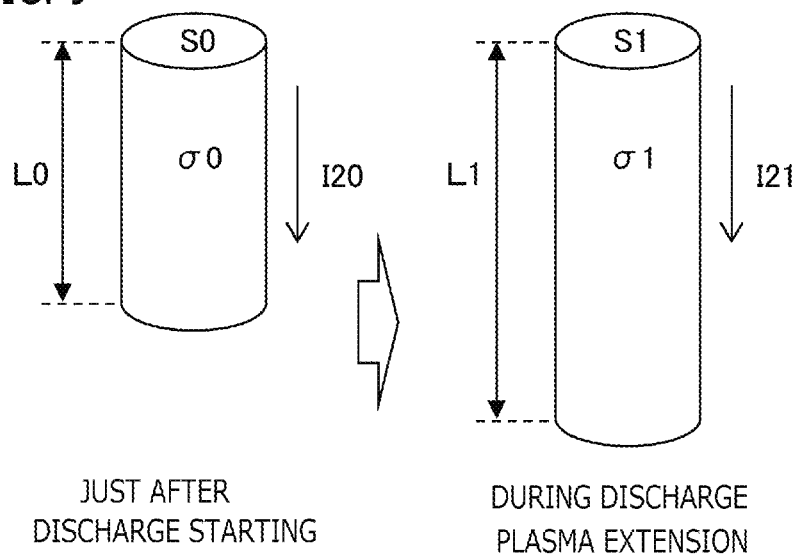
FIG. 9 is an image figure of discharge plasma extension in the concept (A) according to Embodiment 1 of the present disclosure.

Next, the case where there is flow will be considered. Here, as a concept (A), the equation (4) considered in the case of no flow is applied also to the case where there is flow. FIG. 9 shows an image of the discharge plasma just after discharge starting and the discharge plasma during discharge plasma extension. Here, I2, σ, S, L just after discharge starting are expressed by I20, σ0, S0, L0 to which 0 was attached at those ends, respectively; and I2, σ, S, and L during discharge plasma extension (during discharge) are expressed by I21, σ1, S1, L1 to which 1 was attached at those ends, respectively. Since I2/(σ·S) is constant regardless of the discharge plasma length L according to the equation (4), as shown in the next equation, I20/(σ0·S0) just after discharge starting and I21/(σ1·S1) during discharge plasma extension become equal.

$$\frac{I20}{\sigma 0 \cdot S0} = \frac{I21}{\sigma 1 \cdot S1} \quad (5)$$

According to the equation (3), the secondary voltage V20 just after discharge starting and the secondary voltage V21 during discharge plasma extension can be expressed by the equation (6) and the equation (7), respectively.

$$V20 = I20 \cdot \frac{L0}{\sigma 0 \cdot S0} = \frac{I20}{\sigma 0 \cdot S0} \cdot L0 \quad (6)$$

$$V21 = I21 \cdot \frac{L1}{\sigma 1 \cdot S1} = \frac{I21}{\sigma 1 \cdot S1} \cdot L1 \quad (7)$$

When the equation (6) and the equation (7) are substituted in the equation (5) and rearranged, the next equation is derived.

$$\frac{V20}{L0} = \frac{V21}{L1} \Rightarrow \therefore L1 = L0 \cdot \frac{V21}{V20} \quad (8)$$

If this concept is right, the discharge plasma length L1 during discharge plasma extension can be calculated by the equation (8). Here, it can be assumed that the discharge plasma length L0 just after discharge starting is equal to the length Lg between the plug gaps 122. From the behavior of the secondary voltage V2 explained using FIG. 6, the minimum value of the secondary voltage V2 during a predetermined period just after discharge starting can be used as the secondary voltage V20 just after discharge starting. Here, the minimum value of the secondary voltage V2 is measured because change of the secondary voltage V2 has some delay.

<In the Case where there is Flow (Concept (B))>

In the concept (A), it was considered that I2/σ·S is constant as the equation (5) regardless of change of the discharge plasma length L; but in the case where the discharge plasma length L changes every moment, it is hardly considered that I2/σ·S is always constant. Since flowing and extending of the discharge plasma by flow between the plug gaps 122 occurs in a short time, it is also considered that the amount of the ionized gas is the same and the discharge plasma extends by changing only those positions. FIG. 10 shows an image of the discharge plasma before and after a very short time during discharge plasma extension. Here, I2, σ, S, L at the time t1 during discharge plasma extension are expressed by I21, σ1, S1, L1, respectively; and I2, σ, S, L before the very short time from the time t1 during discharge plasma extension are expressed by I21\*, σ1\*, S1\*, L1\*, respectively.

It is assumed that the volume of discharge plasma is constant between before and after the very short time during discharge plasma extension, and it is considered that the next equation is established.

$$S1^* \cdot L1^* = S1 \cdot L1 \quad (9)$$

Since a change that σ1·S1 decreases during the discharge plasma extension, and a change that the secondary current I21 decreases do not coincide with each other, it is considered that the relationship like the equation (5) is not established. Since the change that the secondary current I21 decreases is caused by the decrease of the magnetic energy of the core 136, it is considered that it is later than the change that the cross-section area 51 decreases. Therefore, it is assumed that the next equation in which the secondary current I21 was corrected by the cross-section area before and after the very short time S1\*, S1 is established.

$$\frac{I21^*}{\sigma 1^* \cdot S1^*} = \frac{I21}{\sigma 1 \cdot S1} \cdot \frac{S1}{S1^*} = \frac{I21}{\sigma 1 \cdot S1} \cdot \frac{L1^*}{L1} \quad (10)$$

Although it was assumed that the equation (10) is established at before and after the very short time, when before the very short time is replaced to the time t0 just after discharge starting, the next equation which replaced "1\*" in the equation (10) to "0" is obtained.

$$\frac{I20}{\sigma 0 \cdot S0} = \frac{I21}{\sigma 1 \cdot S1} \cdot \frac{S1}{S0} = \frac{I21}{\sigma 1 \cdot S1} \cdot \frac{L0}{L1} \quad (12)$$

$$\frac{V20}{L0} = \frac{V21}{L1} \cdot \frac{L0}{L1} \Rightarrow L1^2 = L0^2 \cdot \frac{V21}{V20} \Rightarrow \therefore L1 = L0 \cdot \sqrt{\frac{V21}{V20}}$$

In this case, from the equation (6), the equation (7), and the equation (11), the relationship between the discharge plasma length L and the secondary voltage V2 is obtained as the next equation.

$$\frac{I20}{\sigma 0 \cdot S0} = \frac{I21}{\sigma 1 \cdot S1} \cdot \frac{S1}{S0} = \frac{I21}{\sigma 1 \cdot S1} \cdot \frac{L0}{L1} \quad (12)$$

$$\frac{V20}{L0} = \frac{V21}{L1} \cdot \frac{L0}{L1} \Rightarrow L1^2 = L0^2 \cdot \frac{V21}{V20} \Rightarrow \therefore L1 = L0 \cdot \sqrt{\frac{V21}{V20}}$$

<In the Case where there is Flow (Concept (C))>

When a visualized observation of the discharge plasma in the case where there is flow (there is extension of the discharge plasma) was performed, even though the discharge plasma was extended, it did not become thin as it was extended like the concept (B), but it seemed that the discharge plasma was rather extended like the concept (A) without changing the thickness of discharge plasma much. However, if it is considered that there is no change in the amount of ionized gas, it can be thought that the concept (B) is right. Accordingly, although the discharge plasma is extended like the concept (B), since it tries to return to a cross-section area of the discharge plasma corresponding to the secondary current I2 by newly ionizing gas, it can be considered that the discharge plasma seems to be extended while thickness is the same like the concept (A). FIG. 11 shows an image before and after the very short time during discharge plasma extension in the case of this consideration. In this case, it is considered that current flows more easily than the concept (A) by the newly ionized gas. The above is a concept (C).

Here, the next equation is obtained by generalizing the equation (8) and the equation (12) which are the relational equations between the secondary voltage and the discharge plasma length derived in the concept (A) and (B).

$$L1 = L0 \cdot \left(\frac{V21}{V20}\right)^n \quad (13)$$

In the case of n=1, the equation (13) represents the equation (8) of the concept (A), and this case is a concept that current flows as the same as the case where the discharge plasma does not extend, and the resistance per unit length does not change. In the case of n=1/2, the equation (13) represents the equation (12) of the concept (B), and this case is a concept that since the discharge plasma becomes thin, resistance becomes large and current becomes difficult to flow.

Since the concept (C) is a concept that current becomes easy to flow rather than the concept (A), by the newly ionized gas when the discharge plasma extends, if current flows rather than the concept (A), n>1 is expected. It is calculated how much value the exponent n becomes concretely in this concept, based on observation data. The exponent n is calculated by the next equation, by using the minimum value of the secondary voltage during the predetermined period just after the dielectric breakdown as the secondary voltage V20 just after discharge starting, using the plug gap length Lg as the discharge plasma length L0 just after discharge starting, and using the discharge plasma length L and the secondary voltage V2 at a certain time during discharge plasma extension as the discharge plasma length L1 and the secondary voltage V21 during discharge plasma extension.

$$\ln(L1) = \ln\left\{L0 \cdot \left(\frac{V21}{V20}\right)^n\right\} \Rightarrow \ln(L1) = \ln(L0) + n \cdot \ln\left(\frac{V21}{V20}\right) \quad (14)$$

$$\therefore n = \frac{\ln(L1) - \ln(L0)}{\ln\left(\frac{V21}{V20}\right)}$$

When the value of exponent n was calculated from the test result which the applicant of the present disclosure performed, it became a value within a range of substantially 1.0 to 3.0. Since it is considered that this value of exponent n depends on the driving condition of the internal combustion engine 1, especially the cylinder internal pressure and the inner cylinder temperature at the ignition timing, the value of exponent n may be changed according to the cylinder internal pressure, or as the simplest approximation, considering the computation load of the controller 50, it may be simplified to n=2.

Summarizing the above, the discharge plasma length L1 at a certain time during discharge can be calculated by the equation (13), by setting the secondary voltage at the time to V21, using the minimum value of the secondary voltage during the predetermined period just after the dielectric breakdown as the secondary voltage V20 just after discharge starting, and using the plug gap length Lg as the discharge plasma length L0 just after discharge starting; and as the value of exponent n in this case, a value within a range of 1.0 to 3.0 may be used. In the case where there is no flow and the discharge plasma does not extend, since the secondary voltage V2 is constant and the discharge plasma length L is constant, the equation (13) is established regardless of the value of exponent n.

2-3. Calculation Principle of in-Cylinder Flow Speed Va

<Behavior of in-Cylinder Flow and Discharge Plasma>

Next, the calculation principle of an in-cylinder flow speed va will be explained. It is considered that a flow speed of the gas near the ignition plug can be calculated by considering a time change of the discharge plasma length L. However, since the plasma is in the state where molecules constituting gas are ionized, separated into positive ions and electrons, and moving, charged particles having an electric charge of a reverse sign are gathered around this electric charge by receiving Coulomb force in the plasma. Accordingly, the plasma in a flow field exhibits a behavior different from surrounding gas. As a result, since it does not become "the change speed of the discharge plasma length=the in-cylinder flow speed" simply, it is necessary to derive a relationship between the change speed of the discharge plasma length and the in-cylinder flow speed.

Then, Maxwell stress acting on an electric tube of force will be applied as a gathering of Coulomb force acting in the discharge plasma; a relationship among the in-cylinder flow speed, the moving speed of the intermediate part of discharge plasma, and Maxwell stress will be modeled; and a relational equation for estimating the in-cylinder flow speed va will be derived. The details will be explained below.

Figure 12:
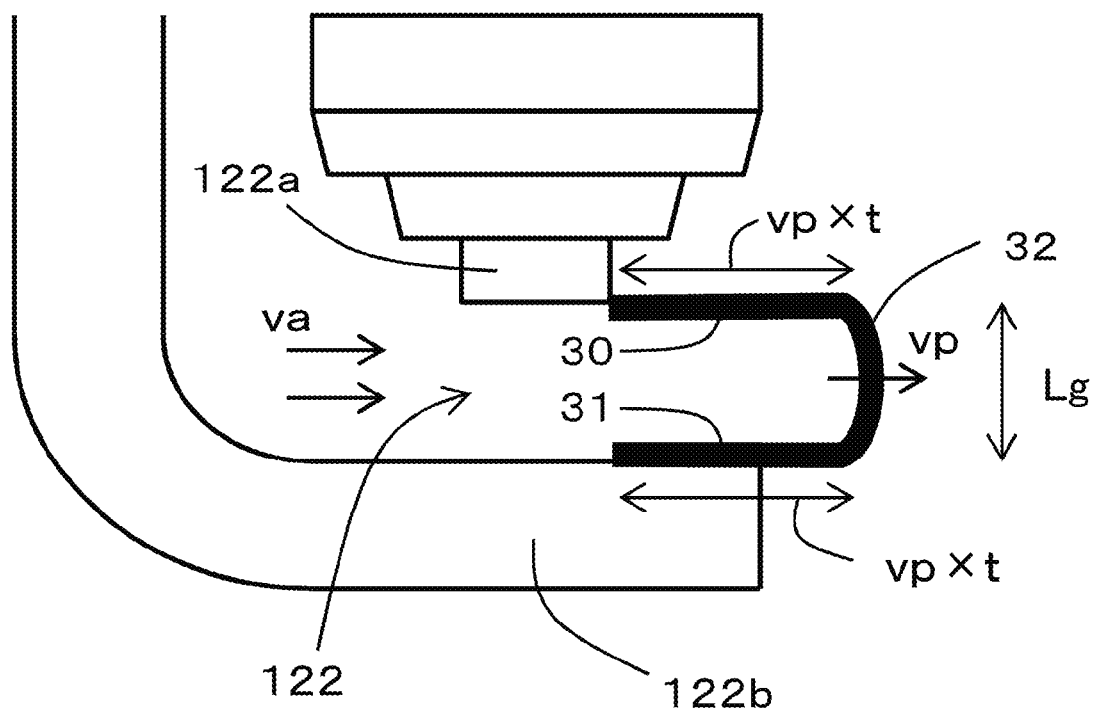
FIG. 12 is an image figure of discharge plasma modeled in U shape according to Embodiment 1 of the present disclosure.

FIG. 12 is an image figure which simply modeled that an extended discharge plasma becomes a U shape. The direction of the in-cylinder flow in the plug gap 122 is supposed to be a direction vertical to the longitudinal direction of the plug gap 122. It is supposed that the discharge plasma of U shape consists of a first side part 30 extending in the in-cylinder flow direction from a center electrode 122a of the plug gap 122, a second side part 31 extending in the in-cylinder flow direction from an earth electrode 122b of the plug gap 122, and a bottom 32 connecting between a tip part of the first side part 30 in the in-cylinder flow direction and a tip part of the second side part 31 in the in-cylinder flow direction. It is supposed that the length of the first side part 30 and the second side part 31 extends from 0 by the in-cylinder flow. It is supposed that the bottom 32 has the length of the plug gap length Lg, and corresponds to the intermediate part 32 of discharge plasma.

When the moving speed at which the intermediate part 32 of discharge plasma moves in the in-cylinder flow direction is set to vp, and the elapsed time after discharge starting is set to t, the discharge plasma length L can be expressed by the next equation. The extending speed of the first and the second side parts 30, 31 becomes equal to the moving speed vp of the intermediate part 32 of discharge plasma. Since two parts of the first side part 30 and the second side part 31 of the U shape extend at the moving speed vp, extension of the discharge plasma length L becomes twice of vp·t.

$$L = Lg + 2 \cdot vp \cdot t \quad (15)$$

By the way, it is considered that the moving speed vp of the intermediate part 32 of discharge plasma changes over time. That is, it is considered that the moving speed vp≈0 just after discharge starting. When the force acting on the discharge plasma by the in-cylinder flow is sufficiently larger than the Coulomb force acted in discharge plasma, it is considered that the moving speed vp≈the in-cylinder flow speed va, after time passes. Then, assuming that the moving speed vp of the intermediate part 32 of discharge plasma changes at each time point, the calculation equation of the discharge plasma length L is expressed by the discretized next equation. Here, Δt is a discretized time interval. m is a number of discretized time series data, and increases by 1 from 0 just after discharge starting whenever the time interval Δt passes. Since two parts of the first side part 30 and the second side part 31 of the U shape extend at the moving speed vp even in the equation (16), the extension width of the discharge plasma length L during the time interval Δt becomes twice of 2·vp·Δt.

$$L(m)=L(m-1)+2\cdot vp(m)\cdot \Delta t$$

$$L(0)=Lg$$

$$\Delta t=t(m)-t(m-1) \tag{16}$$

By the equation (16), a relationship between the moving speed vp (m) of the intermediate part 32 of the discharge plasma changing every moment and the discharge plasma length L (m) can be formulated. The equation (17) is obtained by solving the equation (16) for vp (m). From the equation (17), the moving speed vp (m) of the intermediate part 32 of discharge plasma can be calculated by time change of the discharge plasma length L (m).

$$vp(m) = \frac{1}{2} \cdot \frac{L(m)-L(m-1)}{\Delta t} \tag{17}$$

$$vp(0) = 0$$

$$L(0) = Lg$$

Next, the Coulomb force acted in the discharge plasma will be considered. Since the plasma state is maintained by energy supply by discharge, and current for discharge is flowing, it is considered that the discharge plasma is in the state where electric field is given from outside and also in the state where electric field is generated inside by moving of electrons. Based on this consideration, it can be considered that discharge plasma is the electric tube of force to which the electric field is applied and which floats in space, and it is known that Maxwell stress as a gathering of Coulomb force is applied to this electric tube of force. Maxwell stress F is expressed by the next equation using Maxwell stress tensor T.

$$F = \int T \cdot n dS \tag{18}$$

$$\therefore T = \varepsilon 0 \begin{pmatrix} E_x^2 - \frac{1}{2}E^2 & E_xE_y & E_xE_z \\ E_yE_x & E_y^2 - \frac{1}{2}E^2 & E_yE_z \\ E_zE_x & E_zE_y & E_z^2 - \frac{1}{2}E^2 \end{pmatrix},$$

$$n = \begin{pmatrix} n_x \\ n_y \\ n_z \end{pmatrix}, F = \begin{pmatrix} F_x \\ F_y \\ F_z \end{pmatrix}$$

Here, ε0 is a dielectric constant of vacuum, E is an electric field, n is a unit normal vector on a minute area dS, and subscripts x, y, z mean each component of a Cartesian coordinate system. Although only Maxwell stress by electric field is considered here, Maxwell stress by magnetic field may be considered.

Figure 13:
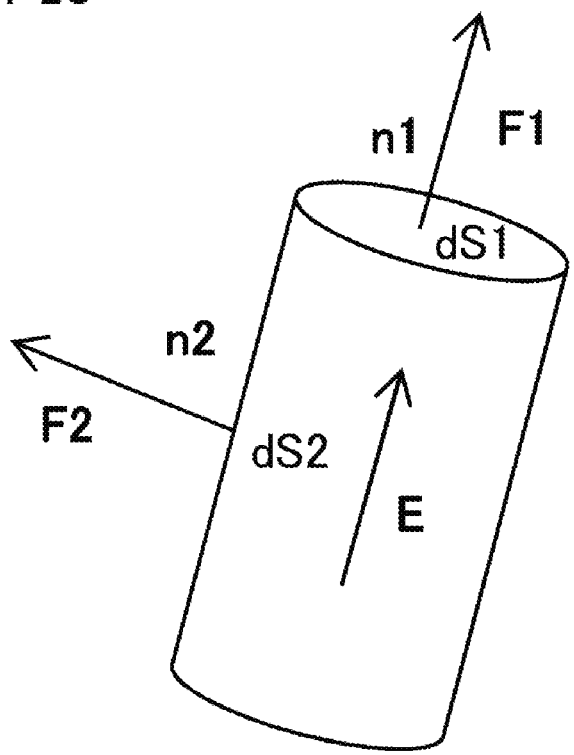
FIG. 13 is an image figure for explaining Maxwell stress according to Embodiment 1 of the present disclosure.

With reference to an image figure shown in FIG. 13 for explaining Maxwell stress applied to the electric tube of force, a force F1 applied in a direction of the electric field and a force F2 applied in a perpendicular direction to the electric field will be explained. It is known that the force F1 applied in the direction of the electric field is expressed by the next equation based on the equation (18), by considering that a vector n1 showing a perpendicular direction of a minute area dS1 is the same direction as the electric field.

$$\frac{dF1}{dS1} = \frac{1}{2} \cdot \varepsilon 0 \cdot E^2 \cdot n1 \tag{19}$$

Similarly, it is known that the force F2 applied in the perpendicular direction to the electric field is expressed by the next equation, by considering that a vector n2 showing a perpendicular direction of a minute area d52 is the perpendicular direction to the electric field.

$$\frac{dF2}{dS2} = -\frac{1}{2} \cdot \varepsilon 0 \cdot E^2 \cdot n2 \tag{20}$$

Thus, it is found that attracting force is acting in the direction of the electric field, and repulsion force is acting in the perpendicular direction of the electric field. That is, forces as if an elastic body like rubber exists are applied to the electric tube of force. From the equation (19) and the equation (20), magnitudes of the forces F1, F2 per unit area are the same, although directions of the forces are different.

Based on the above, a magnitude pm of Maxwell stress applied to the discharge plasma is calculated. Although only the external electric field is considered here for simplification, the internal electric field may be considered for correction. A magnitude E (m) of the electric field becomes a value obtained by dividing the secondary voltage V2 applied to the plug gap 122 by the discharge plasma length L, as shown in the next equation.

$$E(m) = \frac{V2(m)}{L(m)} \tag{21}$$

The magnitude pm (m) of Maxwell stress is expressed by the next equation. To the electric tube of force, the tension of pm (m) shrinking the electric tube of force in the direction along the electric tube of force is applied, and the pressure of −pm (m) pressing the side face of the electric tube of force in the direction perpendicular to the electric tube of force is applied. The electric tube of force behaves like an elastic body which received electric strain.

$$pm(m) = \frac{1}{2} \cdot \varepsilon 0 \cdot E(m)^2 \tag{22}$$

Figure 14:
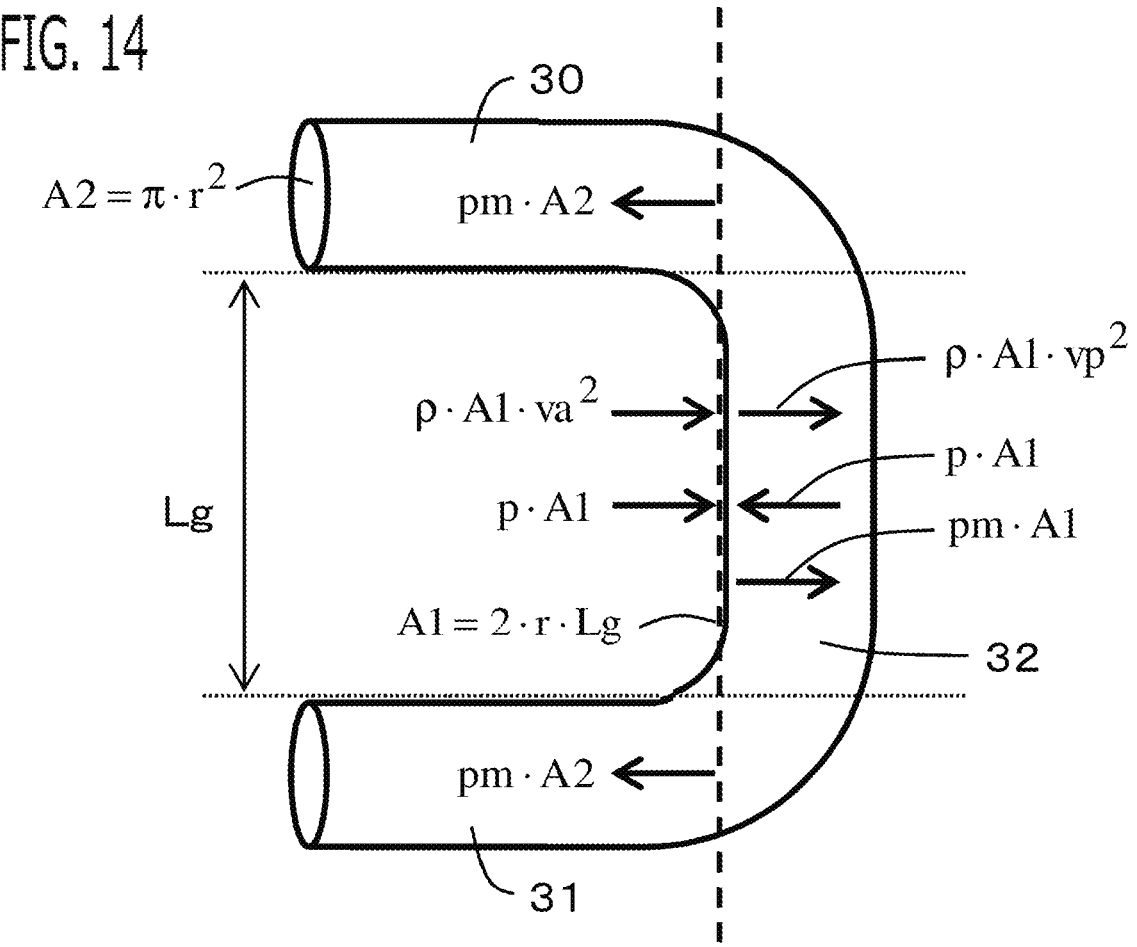
FIG. 14 is an image figure for explaining the equation of momentum around of discharge plasma according to Embodiment 1 of the present disclosure.

Next, FIG. 14 shows an image figure for explaining the equation of momentum around of the discharge plasma.

Conservation of momentum between surrounding gas and the intermediate part 32 of discharge plasma is considered. By setting a radius of the discharge plasma to r, setting a pressure of the surrounding gas to p, and setting a density of the surrounding gas to ρ, the next equation is established in a boundary region between the surrounding gas at the flow direction upstream side of the intermediate part 32 of discharge plasma and the intermediate part 32 of discharge plasma.

$$\rho \cdot A1 \cdot vp^2 - \rho \cdot A1 \cdot va^2 = p \cdot A1 - (p \cdot A1 - pm \cdot A1 + 2 \cdot pm \cdot A2)$$

$$A1 = 2 \cdot r \cdot Lg$$

$$A2 = \pi \cdot r^2 \quad (23)$$

Here, A1 is a project area of the intermediate part 32 of the discharge plasma viewed in the flow direction, and A2 is a cross-section area of the intermediate part 32 of discharge plasma. The left-hand side of the equation (23) considers momentum, and the right-hand side considers force acting on system. In the left-hand side, $\rho \cdot A1 \cdot vp^2$ represents a momentum of the discharge plasma in the boundary, and $\rho \cdot A1 \cdot va^2$ represents a momentum of the surrounding gas in the boundary. In the right-hand side, $p \cdot A1$ of the first term represents a gas pressure acting on the discharge plasma from the upstream side surrounding gas in the boundary, $p \cdot A1$ of the second term represents a gas pressure acting on the upstream side surrounding gas from the discharge plasma in the boundary, and $-pm \cdot A1$ of the third term represents the Maxwell stress (pressure) acting on the discharge plasma in the boundary. $2 \cdot pm \cdot A2$ of the fourth term in the right-hand side represent the Maxwell stress (tension) acting on both ends of the intermediate part 32 of discharge plasma, and is doubled because of acting on the both ends.

The next equation is obtained by solving the equation (23) for va. The in-cylinder flow speed va can be calculated by using the equation (17) for calculation of the moving speed vp of the intermediate part 32 of discharge plasma, and using the equation (22) for calculation of Maxwell stress pm. The gas density ρ is calculated by dividing the intake air amount taken into the combustion chamber 25 by a volume of the combustion chamber 25 determined according to the crank angle. Here, a calculation coefficient K is a coefficient determined by the plug gap length Lg and the radius r of the discharge plasma.

$$va = \sqrt{vp^2 + \frac{-pm \cdot A1 + 2 \cdot pm \cdot A2}{\rho \cdot A1}} = \sqrt{vp^2 + K \cdot \frac{pm}{\rho}} \quad (24)$$

$$K = \frac{\pi \cdot r}{Lg} - 1$$

An approximate expression of the equation (24) become the next equation. As seen from this approximate expression, the in-cylinder flow speed va can be calculated by adding a value according to Maxwell stress pm to the moving speed vp of the intermediate part 32 of discharge plasma.

$$va = \sqrt{vp^2 + K \cdot \frac{pm}{\rho}} \cong vp + \frac{1}{2} \cdot \frac{1}{vp} \cdot K \cdot \frac{pm}{\rho} \quad (25)$$

2-4. Configuration of Each Control Unit of Discharge Plasma Length Calculation Unit 54 and in-Cylinder Flow Calculation Unit 58

Figure 15:
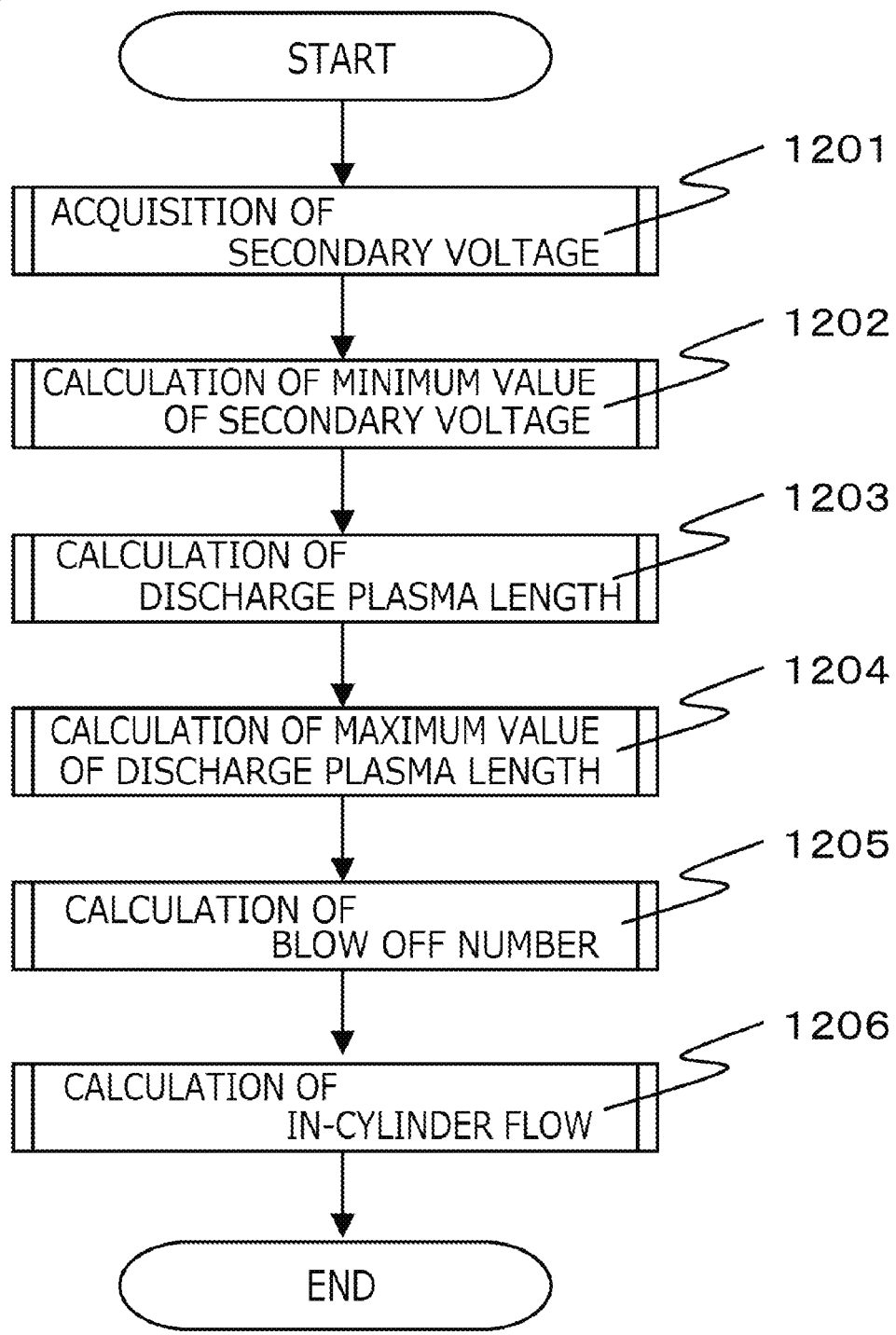
FIG. 15 is a flowchart showing calculation processing of discharge plasma length according to Embodiment 1 of the present disclosure.

Processings of each control unit configured based on the concepts of calculation method of the discharge plasma length and calculation method of the in-cylinder flow speed explained above will be concretely explained with reference to the flowchart in FIG. 15.

<Secondary Voltage Detection Unit 52>

In the step 1201, the secondary voltage detection unit 52 performs a secondary voltage detection processing (a secondary voltage detection step) that detects the secondary voltage V2 which is the voltage generated by the secondary coil 132. In the present embodiment, the secondary voltage detection unit 52 detects the secondary voltage V2 based on the output signal of the ignition coil voltage sensor 134.

Specifically, the secondary voltage detection unit 52 performs an A/D conversion of the divided voltage of the voltage dividing circuit as the ignition coil voltage sensor 134 using the A/D converter of the input circuit 92, and detects the secondary voltage V2 based on an A/D conversion value and a voltage dividing resistance ratio. The secondary voltage detection unit 52 performs the A/D conversion and detects the secondary voltage V2 continuously at least from a shutdown time at which the ignition coil control unit 51 shut down the energization to the primary coil 131 (time t0 of FIG. 5 and FIG. 6) to an end time of discharge (the time t2 of FIG. 5 and time t2* of FIG. 6).

Figures 16, 17:
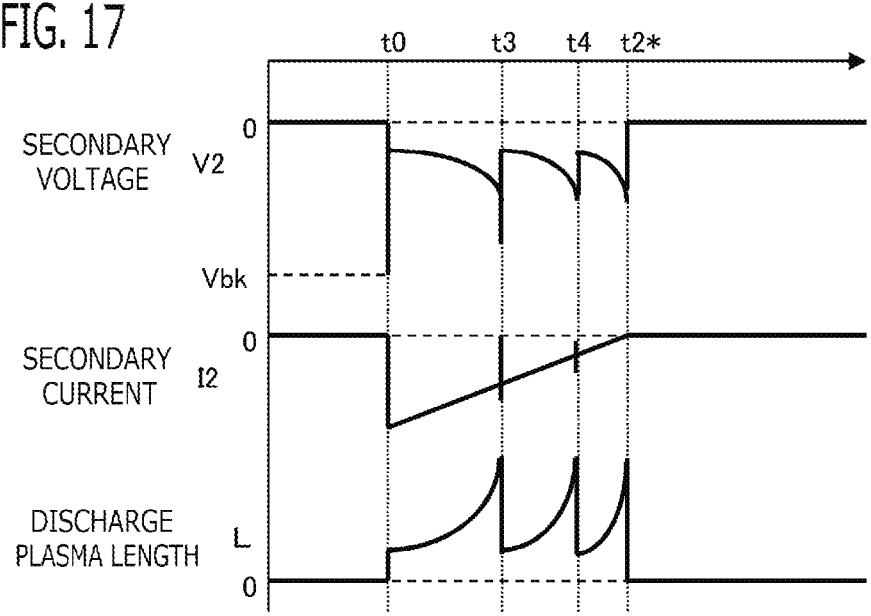
FIG. 16 is a figure for explaining secondary voltage and the like which are memorized in storage apparatus according to Embodiment 1 of the present disclosure.
FIG. 17 is a timing chart showing the behavior of the secondary coil side in the case where blow off of discharge plasma occurs according to Embodiment 1 of the present disclosure.

For example, the secondary voltage detection unit 52 starts the A/D conversion 100 µs before the energization shutdown time to the primary coil 131, and performs the A/D conversion continuously every 50 ρs. Since the normal discharge period t0 to t2 is about 1 ms to 3 ms, the secondary voltage detection unit 52 determines to sample a little longer, and performs the A/D conversion and detects the secondary voltage V2 for 4 ms after A/D conversion starting. Then, as shown in FIG. 17, the secondary voltage detection unit 52 stores the each detection value of the secondary voltage V2 to the storage apparatus 91 such as RAM by correlating with a sampling number m. Whenever the A/D conversion is performed, the sampling number m is increased by 1 from 0.

<Secondary Voltage Minimum Value Calculation Unit 53>

In the successive step 1202, the secondary voltage minimum value calculation unit 53 performs a secondary voltage minimum value calculation processing (a secondary voltage minimum value calculation step) that calculates a minimum value V2 min of the secondary voltage during the discharge period based on the secondary voltage V2 detected by the secondary voltage detection unit 52. In the present disclosure, the secondary voltage V2 means an absolute value of the secondary voltage V2.

As seen from the equation (6) and the like, the secondary voltage V20 just after discharge starting changes according to the plug gap length Lg which becomes equal to the discharge plasma length L0 just after discharge starting, and the electric conductivity σ0 which changes according to the gas density (the cylinder internal pressure) just after discharge starting. According to this configuration, by calculating the minimum value V2 min of the secondary voltage during the discharge period, the secondary voltage V20 just after discharge starting which is varied every ignition can be accurately detected.

For example, the secondary voltage minimum value calculation unit 53 changes the sampling number m from the A/D conversion start number to the end number, and repeatedly performs a processing, as shown in the next equation, which picks up a minimum value between the secondary voltage V2 (m) of the sampling number m and the minimum value V2 min of the secondary voltage in the previous processing and updates the picked up value as the minimum value V2 min of the secondary voltage in this time processing; and consequently, calculates the minimum value V2 min of the secondary voltage during the discharge period. Here, min( ) represents the processing which picks up the minimum value. The secondary voltage V2 near 0 [V] which is out of the discharge period is excluded from the minimum value V2 min of the secondary voltage.

$$V2\min = \min(V2(m), V2\min) \quad (26)$$

Processings after the step 1202 are performed by an interrupt processing at a predetermined crank angle after completion of the continuous A/D conversion, for example, processings are performed in an interrupt processing of BTDC75 degCA which comes first after completion of the A/D conversion.

<Discharge Plasma Length Calculation Unit 54>

In the successive step 1203, the discharge plasma length calculation unit 54 performs a discharge plasma length calculation processing (a discharge plasma length calculation step) that calculates the discharge plasma length L which is the length of discharge plasma, based on the secondary voltage V2 and the minimum value V2 min of the secondary voltage. As seen from the concept of calculation of the discharge plasma length mentioned above, the discharge plasma length L can be calculated based on the secondary voltage V2 and the minimum value V2 min of the secondary voltage.

In the present embodiment, the discharge plasma length calculation unit 54 calculates the discharge plasma length L using the equation (13). The discharge plasma length calculation unit 54 calculates the discharge plasma length L at each time during the discharge period using the equation (13). Here, the discharge plasma length calculation unit 54 calculates the discharge plasma length L(m) of each sampling number m corresponding to each time during the discharge period, based on the minimum value V2 min of the secondary voltage, and the secondary voltage V2(m) of each sampling number m, by use of the next equation obtained by modifying the equation (13) in accordance with the present embodiment. That is, the discharge plasma length calculation unit 54 changes the sampling number m from the A/D conversion start number to the end number, and repeatedly performs calculation of the next equation; and as shown in FIG. 16, stores the each discharge plasma length L (m) to the storage apparatus 91 such as RAM by correlating with the sampling number m.

$$L(m) = Lg \cdot \left(\frac{V2(m)}{V2\min}\right)^n \quad (27)$$

Here, the plug gap length Lg is preliminarily set to a fixed value. The exponent n is set to a value within a range of 1.0 to 3.0. For example, as the simplest approximation, the exponent n is preliminarily set to the fixed value of 2.0 (n=2). By this setting, the computation load of the controller 50 can be reduced.

Alternatively, as mentioned above, since the exponent n changes according to the cylinder internal pressure and the like at the ignition timing, the discharge plasma length calculation unit 54 may change the exponent n within the range of 1.0 to 3.0 according to the driving condition of the internal combustion engine correlated with the cylinder internal pressure at the ignition timing. For example, the discharge plasma length calculation unit 54 calculates the exponent n corresponding to the present driving condition, by referring to an exponent setting map in which the relationship between the exponent n and the driving condition correlated with the cylinder internal pressure is preliminarily set. As the driving condition correlated with the cylinder internal pressure at the ignition timing, the charging efficiency may be used, and in addition to the charging efficiency, the rotational speed of the internal combustion engine may be used. Alternatively, as the driving condition correlated with the cylinder internal pressure at the ignition timing, an estimated cylinder internal pressure which is estimated by the charging efficiency, a relational equation of polytope and the like may be used.

In the successive step 1204, the discharge plasma length calculation unit 54 calculates a maximum value Lmax of the discharge plasma length L during the discharge period based on the discharge plasma length L during the discharge period. For example, the discharge plasma length calculation unit 54 changes the sampling number m from the A/D conversion start number to the end number, and repeatedly performs a processing, as shown in the next equation, which picks up a maximum value between the discharge plasma length L (m) of the sampling number m and the maximum value Lmax of the discharge plasma length in the previous processing and updates the picked up value as the maximum value Lmax of the discharge plasma length in this time processing; and consequently, calculates the maximum value Lmax of the discharge plasma length during the discharge period. Here, max( ) represents the processing which picks up the maximum value. The maximum value Lmax of the discharge plasma length is reset to 0 every ignition.

$$L\max = \max(L(m), L\max) \quad (28)$$

<Calculation of Blow Off Number Nr>

In the successive step 1205, the discharge plasma length calculation unit 54 calculates a blow off number Nr of the discharge plasma during the discharge period based on the discharge plasma length L during the discharge period. The blow off of the discharge plasma means that the discharge plasma is broken off because the in-cylinder flow is too strong; and when energy remains in the core of the ignition coil after the blow off, the spark discharge (re-discharge) usually occurs again. For this reason, in the case where the in-cylinder flow is strong, the blow off of the discharge plasma may occur several times during one ignition. There is a path shortening of the discharge plasma as a similar phenomenon. The path shortening means that when the discharge plasma extended, the discharge plasma switches to a short path because the discharge plasma extended long contacts as it got entangled.

FIG. 17 is a timing chart showing the behavior of the secondary coil 132 side in the case where the blow off and the path shortening of the discharge plasma occur. At the time t3 of FIG. 17, after the blow off of the discharge plasma, the re-discharge occurs. The discharge plasma length L just after re-discharge starting becomes short again to the plug gap length Lg. At the time t3, the secondary voltage V2 (absolute value) rises to near the breakdown voltage Vbk in a short time, after it causes the dielectric breakdown, by the start of re-discharge, the secondary voltage V2 falls to the minimum value V2 min. At the time t3, after the secondary current I2 (absolute value) falls to zero by the blow off of the discharge plasma, by the start of re-discharge, the secondary current I2 recovers to the same level as just before the blow off according to the magnetic energy.

At the time t4, the path shortening occurs. The discharge plasma length just after the path shortening becomes short again to near the plug gap length Lg. At the time t4, although the secondary voltage V2 falls to the minimum value V2 min, it is no necessary to cause the dielectric breakdown, and the secondary voltage V2 does not rise. At the time t4, a variation like a noise is superimposed on the secondary current I2. It is considered that the blow off and the path shortening of the discharge plasma influence flammability similarly and they are counted to the blow off number Nr here. But, only the blow off may be counted.

When the blow off and the path shortening of the discharge plasma occur, the discharge plasma length becomes short instantly. At this time, since the secondary voltage V2 falls to near the minimum value V2 min, the discharge plasma length L calculated by the equation (13) or the equation (27) becomes small instantly. Accordingly, in the case where the time decrease amount ΔL of the discharge plasma length L is larger than a preliminarily set blow off determination value Kjdg, the discharge plasma length calculation unit 54 determines that the blow off occurred and makes the blow off number Nr increase by one.

The discharge plasma length calculation unit 54 calculates a time decrease amount ΔL by subtracting the discharge plasma length L (m) of the present sampling number (m) from the discharge plasma length L (m−1) of the previous sampling number (m−1), as shown in the next equation; determines whether or not the time decrease amount ΔL is larger than the blow off determination value Kjdg; and in the case where it is larger, increases the blow off number Nr by one. The discharge plasma length calculation unit 54 changes the sampling number m from the A/D conversion start number to the end number, performs these processings repeatedly, and calculates the blow off number Nr during the discharge period. Here, the blow off determination value Kjdg is preferably set to a value within a range from the same as the plug gap length Lg to several times of the plug gap length Lg. The blow off number Nr is reset to 0 every ignition.

$$\Delta L(m)=L(m-1)-L(m)$$

$$\Delta L(m)>Kjdg \quad \quad 1)$$

$$Nr=Nr+1$$

$$\Delta L(m) \leq Kjdg \quad \quad 2)$$

$$Nr=Nr \quad \quad (29)$$

If the path shortening is excluded from count of the blow off number Nr, only when the secondary voltage V2 rises to the value near the breakdown voltage Vbk in addition to the condition that the time decrease amount ΔL of the discharge plasma length L becomes larger than the blow off determination value Kjdg, the blow off number Nr may be increased by one.

By calculating the blow off number Nr in this way, in addition to the discharge plasma length L, the value correlated with the in-cylinder flow can be calculated, and the determination accuracy of the strength of the in-cylinder flow can be improved.

<In-Cylinder Flow Calculation Unit 58>

In the successive step 1206, the in-cylinder flow calculation unit 58 performs an in-cylinder flow calculation processing (in-cylinder flow calculation step) that calculates the in-cylinder flow speed va which is a flow speed of the gas in the combustion chamber, based on the time change of the discharge plasma length L and the Coulomb force applied to the charged particles of the discharge plasma. As seen from the concept of in-cylinder flow speed calculation mentioned above, the in-cylinder flow speed va can be calculated based on the time change of the discharge plasma length L and the Coulomb force of the discharge plasma.

In the present embodiment, the in-cylinder flow calculation unit 58 calculates the moving speed vp at which the intermediate part 32 of discharge plasma moves in the in-cylinder flow direction by extension of the discharge plasma by the in-cylinder flow, based on the time change of the discharge plasma length L. For example, the next equation similar to the equation (17) is used. The equation (17) is derived from supposing that the discharge plasma is modeled in the U shape, and two parts of the first side part 30 and the second side part 31 of the U shape extend at the moving speed vp of the intermediate part 32. The in-cylinder flow calculation unit 58 calculates a value obtained by dividing the time change rate of the discharge plasma length L by 2, as the moving speed vp of the intermediate part 32 of discharge plasma. The in-cylinder flow calculation unit 58 calculates, as the time change rate of the discharge plasma length L, a value obtained by dividing a value obtained by subtracting the discharge plasma length L (m−1) of the previous sampling number (m−1) from the discharge plasma length L (m) of the present sampling number (m) by the sampling time interval Δt, and calculates a value obtained by dividing this time change rate by 2, as the moving speed vp (m) of the intermediate part 32 of the present sampling number (m). As shown in FIG. 16, the in-cylinder flow calculation unit 58 changes the sampling number m from the A/D conversion start number to the end number, and repeatedly performs calculation of the moving speed vp and memorizes it to the storage apparatus 91 such as RAM.

$$vp(m) = \frac{1}{2} \cdot \frac{L(m)-L(m-1)}{\Delta t} \quad \quad (30)$$

As mentioned above, to the discharge plasma as the electric tube of force, the tension of Maxwell stress pm shrinking the discharge plasma in the direction along the discharge plasma is applied, and the pressure of Maxwell stress pm pressing the side face of the discharge plasma in the direction perpendicular to the discharge plasma is applied. The discharge plasma behaves like the elastic body which received the electric strain. Accordingly, Maxwell stress pm acts on the discharge plasma which tends to extend according to the in-cylinder flow. The in-cylinder flow calculation unit 58 calculates Maxwell stress pm applied to the discharge plasma by the Coulomb force, based on the secondary voltage V2 and the discharge plasma length L. The in-cylinder flow calculation unit 58 calculates Maxwell stress pm by using the next equation similar to the equation (21) and the equation (22). Here, the dielectric constant of vacuum ε0 is a preliminarily set value. As shown in FIG. 16, the in-cylinder flow calculation unit 58 changes the sampling number m from the A/D conversion start number to the end number, and repeatedly performs calculation of the Maxwell stress pm and memorizes it to the storage apparatus 91 such as RAM.

$$pm(m) = \frac{1}{2} \cdot \varepsilon 0 \cdot \left(\frac{V2(m)}{L(m)}\right)^2 \quad \quad (31)$$

The in-cylinder flow calculation unit 58 calculates the in-cylinder flow speed va, based on the moving speed vp of the intermediate part 32 of the discharge plasma and the Maxwell stress pm. According to this configuration, by considering a deviation between the in-cylinder flow speed va and the moving speed vp of the discharge plasma, which is caused by the tension of Maxwell stress pm and the like acting on the discharge plasma, the in-cylinder flow speed va can accurately be calculated.

As mentioned above, about the intermediate part 32 of the discharge plasma modeled in the U shape, the equation (24) can be derived from the equation of momentum of the equation (23) considering Maxwell stress pm. The in-cylinder flow calculation unit 58 calculates the in-cylinder flow speed va based on the moving speed vp of the intermediate part 32 of the discharge plasma, and Maxwell stress pm, by using the first equation of the next equation similar to the equation (24).

$$va = \sqrt{vp^2 + K \cdot \frac{pm}{\rho}} \quad (32)$$
$$K = \frac{\pi \cdot r}{Lg} - 1$$

Here, the calculation coefficient K may be preliminarily set to a value calculated by the plug gap length Lg and the radius r of the discharge plasma using the second equation of the equation (32), or, may be set to a matching value adjusted based on experimental data. The in-cylinder flow calculation unit 58 calculates a volume of the combustion chamber 25 based on the crank angle, using a characteristic data that represents a geometrical relation between the crank angle and the volume of the combustion chamber 25, and calculates the gas density ρ by dividing the intake air amount taken into in the combustion chamber 25 by the volume of the combustion chamber 25. As shown in FIG. 16, the in-cylinder flow calculation unit 58 changes the sampling number m from the A/D conversion start number to the end number, and repeatedly performs calculation of the in-cylinder flow speed va and memorizes it to the storage apparatus 91 such as RAM.

Alternatively, as seen from the equation (25) which approximated the equation (24), the in-cylinder flow speed va can be calculated by adding a value according to Maxwell stress pm to the moving speed vp of the intermediate part 32 of discharge plasma. Then, the in-cylinder flow calculation unit 58 may calculate a value obtained by adding a value according to Maxwell stress pm to the moving speed vp of the intermediate part 32 of discharge plasma, as the in-cylinder flow speed va. Here, the in-cylinder flow calculation unit 58 may calculate the value according to Maxwell stress pm by using the right-hand side second term of the equation (25), or may calculate the value according to Maxwell stress pm by using the other function which uses Maxwell stress pm and the moving speed vp of the intermediate part 32 of discharge plasma as variables. For example, the function is set to an approximate expression based on experimental data, and the like.

Figure 18:
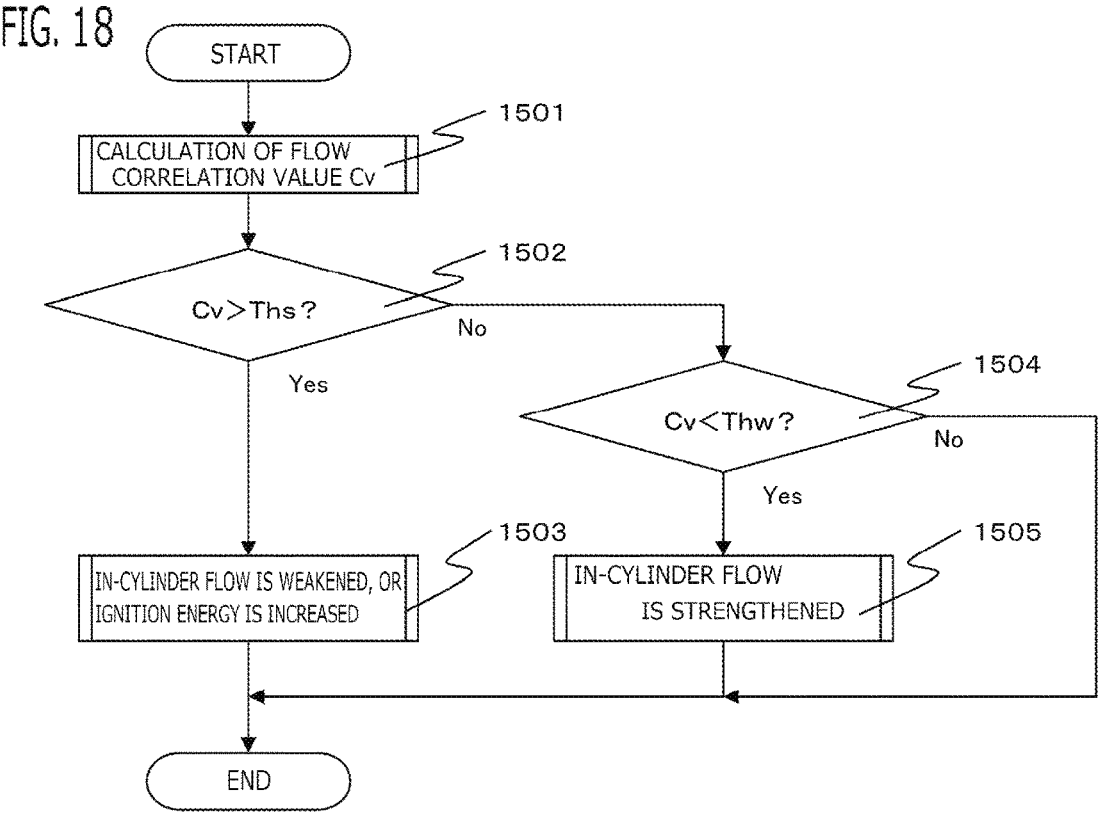
FIG. 18 is a flowchart showing processing which operates in-cylinder flow based on discharge plasma length according to Embodiment 1 of the present disclosure.

Next, processing which operates the in-cylinder flow based on the discharge plasma length L, the in-cylinder flow speed va, and the like will be explained, referring to the flowchart of FIG. 18.

<Flow Correlation Value Calculation Unit 55>

In the step 1501, the flow correlation value unit 55 implements a flow correlation value calculation processing (a flow correlation value calculation step) that calculates a flow correlation value Cv, which represents a strength of an in-cylinder flow which is a flow in the combustion chamber 25, based on one or both of the discharge plasma length L and the in-cylinder flow speed va. In the case of using the discharge plasma length L, the flow correlation value calculation unit 55 calculates the flow correlation value Cv, based on the maximum value Lmax of the discharge plasma length during the discharge period which is calculated based on the discharge plasma length L during the discharge period. As shows in FIG. 19, the flow correlation value calculation unit 55 makes the flow correlation value Cv increase gradually, as the maximum value Lmax of the discharge plasma length during the discharge period increases from the preliminarily set plug gap length Lg.

Figure 20:
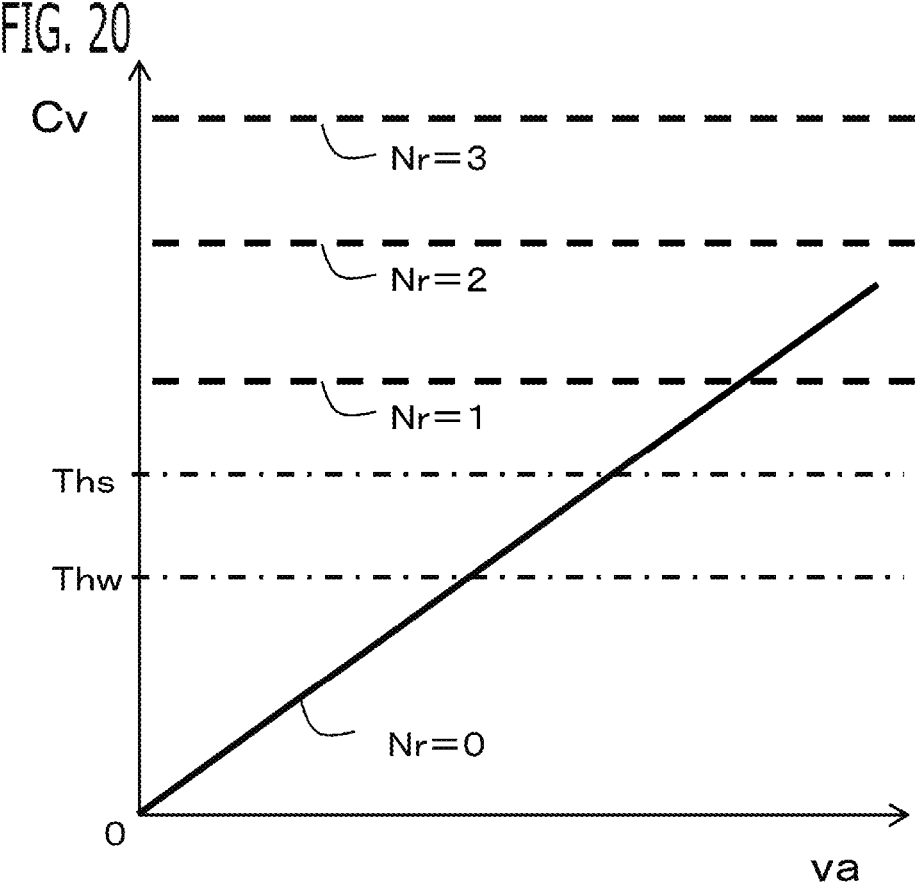
FIG. 20 is a figure for explaining calculation of flow correlation value according to in-cylinder flow speed and blow off number according to Embodiment 1 of the present disclosure.

In the case of using the in-cylinder flow speed va, the flow correlation value calculation unit 55 calculates the flow correlation value Cv based on a statistical processing value, such as an average value or a maximum value, of the in-cylinder flow speed va during the discharge period. As shown in FIG. 20, the flow correlation value calculation unit 55 makes the flow correlation value Cv increase gradually as the statistical processing value of the in-cylinder flow speed va increases.

The flow correlation value calculation unit 55 may use one of the flow correlation value Cv calculated using the discharge plasma length L, and the flow correlation value Cv calculated using the in-cylinder flow speed va, or may use an average value of both, or may switch which one is used according to an operating condition.

When the blow off of the discharge plasma or the path shortening occurs because the in-cylinder flow is too strong, the discharge plasma length L once becomes short by the blow off; for this reason, the maximum value Lmax of the discharge plasma length does not become as large as the strength of the in-cylinder flow. When the blow off or the path shortening occurs, the time change rate of the discharge plasma length L is disrupted, and the calculation accuracy of the in-cylinder flow speed va is deteriorated. Accordingly, the flow correlation value calculation unit 55 calculates the flow correlation value Cv based on the maximum value Lmax of the discharge plasma length during the discharge period or the in-cylinder flow speed va, and the blow off number Nr. If deterioration of the calculation accuracy of the in-cylinder flow speed va can be suppressed by statistical processing of the in-cylinder flow speed va, the blow off number Nr may not be considered in calculation of the flow correlation value Cv.

Figure 19:
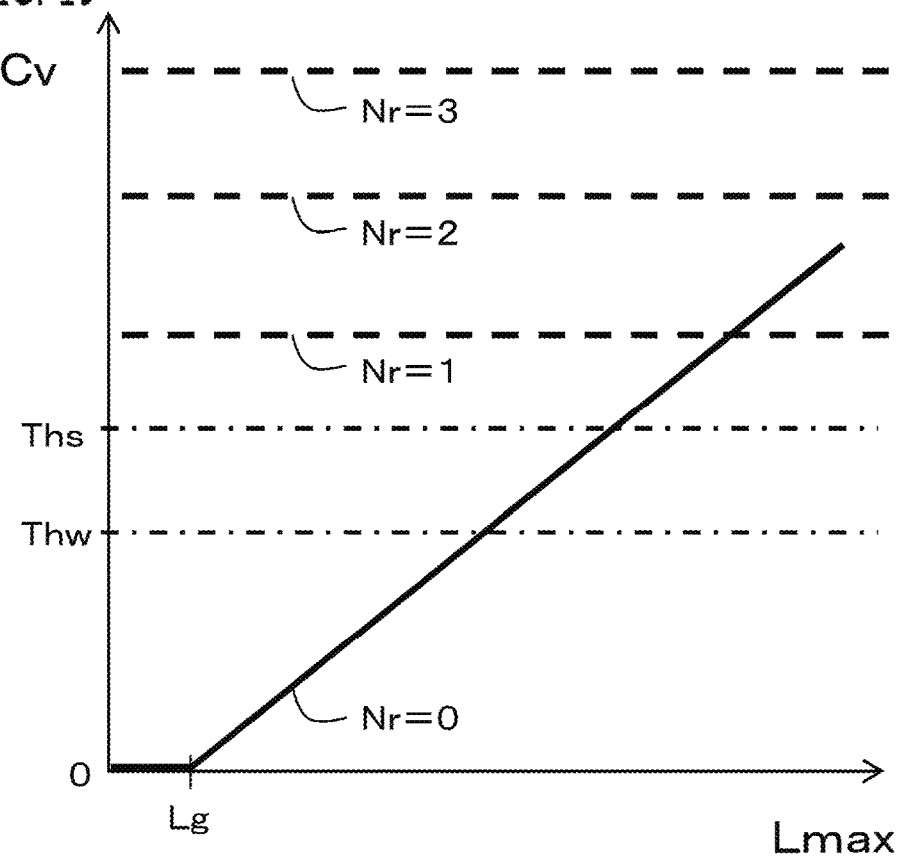
FIG. 19 is a figure for explaining calculation of flow correlation value according to discharge plasma length and blow off number according to Embodiment 1 of the present disclosure.

For example, in the case where the blow off number Nr during the discharge period is 0 time, the flow correlation value calculation unit 55 calculates the flow correlation value Cv based on the maximum value Lmax of the discharge plasma length during the discharge period or the in-cylinder flow speed va, as mentioned above. When the blow off number Nr during the discharge period is greater than or equal to once, the flow correlation value calculation unit 55 calculates the flow correlation value Cv based on the blow off number Nr. Here, the flow correlation value Cv based on the blow off number Nr is set to a larger value than a strong flow determination value Ths described below. That is to say, when the blow off number Nr during the discharge period is greater than or equal to once, the flow control unit 56 described below determines that the in-cylinder flow is strong. As shown in FIG. 19 and FIG. 20, the flow correlation value calculation unit 55 makes the flow correlation value Cv increase gradually as the blow off number Nr during the discharge period increases.

<Flow Control Unit 56 and Ignition Energy Increase Unit 57>

In the step 1502 to the step 1505, the flow control unit 56 implements a flow control processing (a flow control step) that determines whether the in-cylinder flow is strong or weak based on the flow correlation value Cv; in the case of determining that the in-cylinder flow is strong, controls a flow operation mechanism which can operate the in-cylinder flow, to a side which the flow is weakened; and in the case of determining that the in-cylinder flow is weak, controls the flow operation mechanism to a side which the flow is strengthened.

In the present embodiment, in the step 1502, the flow control unit 56 determines whether or not the flow correlation value Cv is larger than the preliminarily set strong flow determination value Ths and the in-cylinder flow is strong. In the case of determining that the flow correlation value Cv is larger than the strong flow determination value Ths and the in-cylinder flow is strong in the step 1502, the flow control unit 56 controls the flow operation mechanism to the side which the flow is weakened in the step 1503.

In the present embodiment, the flow operation mechanism is the variable valve timing mechanism which can change the opening and closing timing of the intake valve 10 and the exhaust valve 11; and in the step 1503, the flow control unit 56 changes the phase angle of the opening and closing timing of the intake valve 10, and the phase angle of the opening and closing timing of the exhaust valve 11 in the direction in which the in-cylinder flow is weakened. The flow control unit 56 calculates the phase angles of the intake valve and the exhaust valve for weakening the in-cylinder flow corresponding to the present driving condition, by referring to a phase angle map in which the relationship between the driving condition, such as the rotational speed and the charging efficiency, and the phase angles of the intake valve and the exhaust valve for weakening the in-cylinder flow is preliminarily set. Then, the flow control unit 56 changes the phase angles of the intake valve and the exhaust valve toward the phase angles of the intake valve and the exhaust valve for weakening the in-cylinder flow.

In the step 1503, in the case of determining that the in-cylinder flow is strong, the ignition energy increase unit 57 commands the ignition coil control unit 51 to increase the ignition energy supplied to the ignition plug 12. Specifically, the ignition coil control unit 51 commands the ignition energy increase unit 57 to make the energizing time increase from a value calculated according to driving condition. If the energizing time is extended, because the magnetic energy stored in the core 136 by the primary coil 131 increases, the secondary current I2 becomes large. In this case, since the cross-section area S of the discharge plasma becomes large as thought by the equation (4), the discharge plasma becomes difficult to blow off and the ignitability of fuel-air mixture is improved.

On the other hand, in the case of determining that the flow correlation value Cv is not larger than the strong flow determination value Ths in the step 1502, the flow control unit 56 advances to the step 1504, and determines whether or not the flow correlation value Cv is smaller than a weak flow determination value Thw which is preliminarily set to a value less than or equal to the strong flow determination value Ths, and the in-cylinder flow is weak. In the case of determining that the flow correlation value Cv is smaller than the weak flow determination value Thw and the in-cylinder flow is weak in the step 1504, the flow control unit 56 controls the flow operation mechanism (the phase angles of the intake valve and the exhaust valve) to the side which the flow is strengthened in the step S1505.

In the present embodiment, in the step 1505, the flow control unit 56 changes the phase angle of the opening and closing timing of the intake valve 10 and the phase angle of the opening and closing timing of the exhaust valve 11 in the direction in which the in-cylinder flow is strengthened. The flow control unit 56 calculates the phase angles of the intake valve and the exhaust valve for strengthening the in-cylinder flow corresponding to the present driving condition, by referring to a phase angle map in which the relationship between the driving condition, such as the rotational speed and the charging efficiency, and the phase angles of the intake valve and the exhaust valve for strengthening the in-cylinder flow is preliminarily set. Then, the flow control unit 56 changes the phase angles of the intake valve and the exhaust valve toward the phase angles of the intake valve and the exhaust valve for strengthening the in-cylinder flow.

In the step 1504, in the case of determining that the in-cylinder flow is weak, the ignition energy increase unit 57 does not change the ignition energy supplied to the ignition plug 12. That is to say, the energizing time is maintained at the value calculated according to the driving condition.

On the other hand, in the case of determining that the flow correlation value Cv is not smaller than the weak flow determination value Thw in the step 1504, the flow control unit 56 determines that it is in the intermediate flow state where the in-cylinder flow is neither strong nor weak. Then, the flow control unit 56 does not change the flow operation mechanism (the phase angles of the intake valve and the exhaust valve) to the strengthening side or the weakening side, and then ends the processing. The ignition energy increase unit 57 does not change the ignition energy, either.

As described above, by estimating the discharge plasma length L and the in-cylinder flow speed va, and controlling the in-cylinder flow and the ignition energy based on one or both of the estimated discharge plasma length L and the in-cylinder flow speed va, even in combustion such as high dilution combustion, which the stable combustion region is narrow, good flammability can be secured.

OTHER EMBODIMENTS

Lastly, other embodiments of the present disclosure will be explained. Each of the configurations of embodiments to be explained below is not limited to be separately utilized but can be utilized in combination with the configurations of other embodiments as long as no discrepancy occurs.

(1) In the above-mentioned Embodiment 1, there has been explained the case where the secondary voltage detection unit 52 detects the secondary voltage V2 based on the output signal of the ignition coil voltage sensor 134 which detects the secondary voltage V2 directly. However, because the secondary voltage V2 is very high voltage, when this voltage is taken into the controller 50, a large noise is generated, and there is a possibility that the controller 50 causes malfunction; so, a noise countermeasure is required. Accordingly, the secondary voltage detection unit 52 may detect a primary voltage V1 which is a voltage generated by the primary coil 131, and detects the secondary voltage V2 based on the primary voltage V1.

Figure 21:
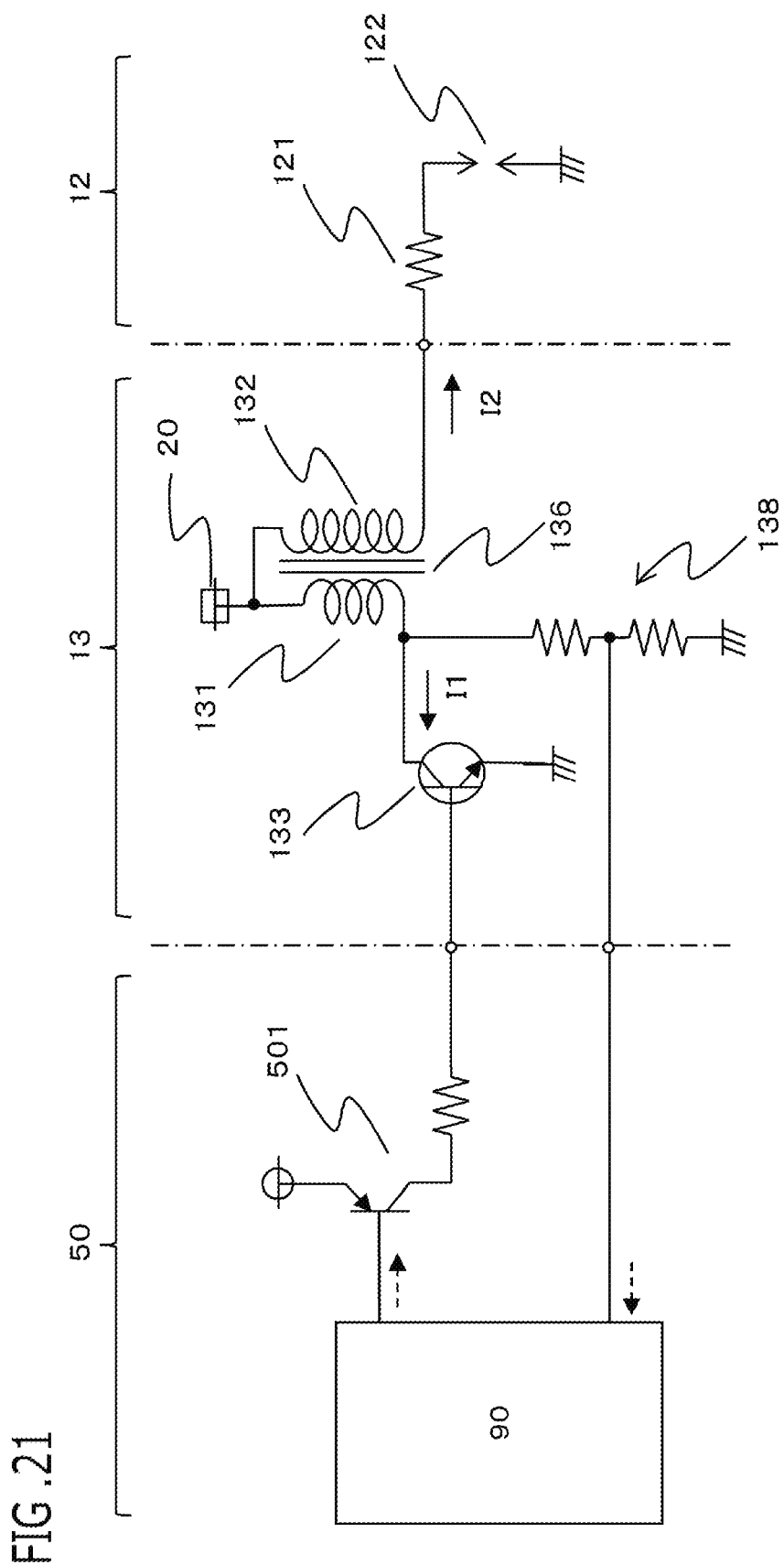
FIG. 21 is a schematic circuit diagram of ignition coil and ignition plug according to other Embodiment of the present disclosure.

FIG. 21 shows a circuit configuration diagram of the spark plug 12 and the ignition coil 13 in this case. The ignition coil 13 is provided with an ignition coil voltage sensor 138 which outputs an electric signal according to a primary voltage V1 which is a voltage generates by the primary coil 131. The ignition coil voltage sensor 138 is a voltage dividing circuit which divides the primary voltage V1 by two resistances connected in series, and is connected in parallel with the igniter 133. The divided voltage of the connection point of two resistances is inputted to the controller 50.

One end of the primary coil 131 is connected to the positive electrode of the direct current power source 20, and the other end of the primary coil 131 is connected to the ground via the igniter 133. The other end of the primary coil 131 is connected to the ground via the ignition coil voltage sensor 138 which is the voltage dividing circuit. One end of the secondary coil 132 is connected to the positive electrode of the direct current power source 20, and the other end of the secondary coil 132 is connected to the ground via the ignition plug 12.

The secondary voltage detection unit 52 performs an A/D conversion of the divided voltage of the voltage dividing circuit as the ignition coil voltage sensor 138 using the A/D converter of the input circuit 92, and detects the primary voltage V1 based on an A/D conversion value and a voltage dividing resistance ratio. Then, the secondary voltage detection unit 52 detects a value obtained by multiplying a winding number ratio N of the primary coil 131 and the secondary coil 132 to the detected primary voltage V1, as the secondary voltage V2, as shown in the next equation. The winding number ratio N is a value obtained by dividing a winding number of the secondary coil 132 by a winding number of the primary coil 131, and is preliminarily set.

$$V2=V1 \cdot N \quad (33)$$

According to this configuration, since the primary voltage V1 whose voltage is lower than the secondary voltage V2 is taken into the controller 50, noise can be suppressed and the noise countermeasure of voltage detection can be reduced as compared with Embodiment 1.

(2) In the above-mentioned Embodiment 1, there has been explained the case where the flow operation mechanism is the variable valve timing mechanism which can change the opening and closing timing of the intake valve 10 and the exhaust valve 11. However, embodiments of the present disclosure are not limited to the foregoing case. That is to say, the flow operation mechanism may be any mechanism, as long as it is a mechanism which can operate the in-cylinder flow; one or more flow operation mechanisms may be provided, and it may be controlled based on the flow correlation value Cv. For example, the flow operation mechanism may be an intake port valve which closes a part of the intake port and generates a swirl flow or a tumble flow in the combustion chamber 25. The controller 50 controls an electric actuator and changes an opening degree of the intake port valve.

Generally, the intake port valve which generates the swirl flow is called a swirl control valve, for example, it closes only one side of the two intake ports, and can operate the strength of the swirl flow in the combustion chamber 25. Generally, the intake port valve which generates the tumble flow is called a tumble control valve, for example, it closes only upper side or lower side of the intake port, and can operate the strength of the tumble flow in the combustion chamber 25.

In the case of determining that the flow is strong, the flow control unit 56 changes the opening degree of the intake port valve to a side where the flow is weakened (for example, the opening side); and in the case of determining that the flow is weak, the flow control unit 56 changes the opening degree of the intake port valve to the side which the flow is strengthened (for example, the closing side).

(3) In the above-mentioned Embodiment 1, there has been explained the case where the discharge plasma length calculation unit 54 calculates the discharge plasma length L by the equation (13) or the equation (27). However, embodiments of the present disclosure are not limited to the foregoing case. That is to say, the discharge plasma length calculation unit 54 may use other methods, as long as it calculates the discharge plasma length L based on the secondary voltage V2 and the minimum value V2 min of secondary voltage. For example, the discharge plasma length calculation unit 54 may calculate the discharge plasma length L corresponding to this time secondary voltage V2 and this time minimum value V2 min of secondary voltage, by referring to a plasma length map in which the relationship between the secondary voltage V2 and the minimum value V2 min of secondary voltage (for example, V2/V2 min), and the discharge plasma length L is preliminarily set.

(4) In the above-mentioned Embodiment 1, there has been explained the case where in the case where the flow correlation value Cv is larger than the strong flow determination value Ths, the flow control unit 56 controls the flow operation mechanism to the side where the flow is weakened; in the case where the flow correlation value Cv is smaller than the weak flow determination value Thw, the flow control unit 56 controls the flow operation mechanism to the side where the flow is strengthened. However, embodiments of the present disclosure are not limited to the foregoing case. That is to say, the flow control unit 56 may use any method, as long as it determines the strength of the in-cylinder flow based on the flow correlation value Cv, controls the flow operation mechanism to the side where the flow is weakened in the case determining that the flow is strong, and controls the flow operation mechanism to the side where the flow is strengthened in the case of determining that the flow is weak. For example, the flow control unit 56 may change an operating amount of the flow operation mechanism to the side where the flow is strengthened or weakened, according to a difference between a target flow correlation value and the flow correlation value Cv.

Various modifications and alterations of this disclosure will be apparent to those skilled in the art without departing from the scope and spirit of this disclosure, and it should be understood that this is not limited to the illustrative embodiments set forth herein.

What is claimed is:
1. A controller for an internal combustion engine that is provided with an ignition plug which has a plug gap disposed in a combustion chamber, and an ignition coil which has a primary coil in which power is supplied from a direct current power source and a secondary coil which has more winding number than the primary coil and generates high voltage supplied to the ignition plug, the controller for the internal combustion engine comprising:
   an ignition coil controller that shuts down after connecting electrically the primary coil and the direct current power source for generating high voltage in the secondary coil and generating spark discharge in the plug gap;
   a secondary voltage detector that detects a secondary voltage which is a voltage generated by the secondary coil;
   a secondary voltage minimum value calculator that calculates a minimum value of the secondary voltage during a discharge period based on the detected secondary voltage;

a discharge plasma length calculator that calculates a length of the discharge plasma based on the secondary voltage and the minimum value of the secondary voltage; and an in-cylinder flow calculator that calculates an in-cylinder flow speed which is a flow speed of gas in the combustion chamber, based on a time change of the length of the discharge plasma and a Coulomb force applied to charged particles of the discharge plasma.

2. The controller for the internal combustion engine according to claim 1, wherein the in-cylinder flow calculator calculates a moving speed at which an intermediate part of the discharge plasma moves in an in-cylinder flow direction by extension of the discharge plasma by an in-cylinder flow, based on the time change of the length of the discharge plasma;

calculates a Maxwell stress applied to the discharge plasma by the Coulomb force, based on the secondary voltage and the length of the discharge plasma; and calculates the in-cylinder flow speed, based on the moving speed of the intermediate part of the discharge plasma and the Maxwell stress.

3. The controller for the internal combustion engine according to claim 2, wherein the in-cylinder flow calculator calculates a value obtained by dividing a time change rate of the length of the discharge plasma by 2, as the moving speed of the intermediate part of the discharge plasma; and by setting the Maxwell stress to pm, setting the secondary voltage to V2, setting the length of the discharge plasma to L, and setting a preliminarily set dielectric constant of vacuum to ε0, calculates the Maxwell stress by a calculation equation of "$pm=1/2 \times \varepsilon 0 \times (V2/L)^2$".

4. The controller for the internal combustion engine according to claim 2, wherein the in-cylinder flow calculator calculates a value obtained by adding a value according to the Maxwell stress to the moving speed of the intermediate part of the discharge plasma, as the in-cylinder flow speed.

5. The controller for the internal combustion engine according to claim 2, wherein by setting the in-cylinder flow speed to va, setting the moving speed of the intermediate part of the discharge plasma to vp, setting the Maxwell stress to pm, setting a density of the gas in the combustion chamber to ρ, and setting a preliminarily set calculation coefficient to K, the in-cylinder flow calculator calculates the in-cylinder flow speed by a calculation equation of "$va=\sqrt{(vp^2+K \times pm/\rho)}$".

6. The controller for the internal combustion engine according to claim 1, wherein by setting the length of the discharge plasma to L, setting the secondary voltage to V2, setting the minimum value of the secondary voltage to V20, setting a preliminarily set length of the plug gap to Lg, and setting an exponent, which is set to a value within a range of 1.0 to 3.0, to n, the discharge plasma length calculator calculates the length of the discharge plasma by a calculation equation of "$L=Lg \times (V2/V20)^n$".

7. The controller for the internal combustion engine according to claim 6, wherein the exponent is set to 2.0.

8. The controller for the internal combustion engine according to claim 6, wherein the discharge plasma length calculator changes the exponent within the range of 1.0 to 3.0, according to a driving condition of the internal combustion engine correlated with a pressure in the combustion chamber at ignition timing.

9. The controller for the internal combustion engine according to claim 1, further comprising:

a flow correlation value calculator that calculates a flow correlation value, which represents a strength of a flow in the combustion chamber, based on the in-cylinder flow speed; and a flow controller that determines whether the flow in the combustion chamber is strong or weak based on the flow correlation value; in the case of determining that the flow is strong, controls a flow operation mechanism which can operate the flow of the combustion chamber, to a side where the flow is weakened; and in the case of determining that the flow is weak, controls the flow operation mechanism to a side where the flow is strengthened.

10. The controller for the internal combustion engine according to claim 1, further comprising:

a flow correlation value calculator that calculates a flow correlation value, which represents a strength of a flow in the combustion chamber, based on the in-cylinder flow speed; and an ignition energy increase controller that determines whether the flow in the combustion chamber is strong or weak based on the flow correlation value; and in the case of determining that the flow is strong, commands the ignition coil controller to increase an ignition energy supplied to the ignition plug.

11. The controller for the internal combustion engine according to claim 9, wherein the discharge plasma length calculator calculates a blow off number which is a number of times that the discharge plasma broke off during the discharge, based on the length of the discharge plasma during the discharge period, and wherein the flow correlation value calculator calculates the flow correlation value based on the in-cylinder flow speed and the blow off number.

12. The controller for the internal combustion engine according to claim 9, wherein the flow operation mechanism is one or both of a variable valve timing mechanism which can change an opening and closing timing of an intake valve and an exhaust valve, and an intake port valve which closes apart of an intake port and generates a swirl flow or a tumble flow in the combustion chamber.

13. The controller for the internal combustion engine according to claim 1, wherein the secondary voltage detector detects a voltage generated by the primary coil, and detects a value obtained by multiplying a winding number ratio of the primary coil and the secondary coil to the voltage of the primary coil, as the secondary voltage.

14. A control method for an internal combustion engine that is provided with an ignition plug which has a plug gap disposed in a combustion chamber, and an ignition coil which has a primary coil in which power is supplied from a direct current power source and a secondary coil which has more winding number than the primary coil and generates high voltage supplied to the ignition plug, the control method for the internal combustion engine comprising:

shutting down after connecting electrically the primary coil and the direct current power source for generating high voltage in the secondary coil and generating spark discharge in the plug gap;

detecting a secondary voltage which is a voltage generated by the secondary coil;

calculating a minimum value of the secondary voltage during a discharge period based on the detected secondary voltage;

calculating a length of discharge plasma based on the secondary voltage and the minimum value of the secondary voltage; and calculating an in-cylinder flow speed which is a flow speed of gas in the combustion chamber, based on a time change of the length of the discharge plasma and a Coulomb force applied to charged particles of the discharge plasma.

* * * * *